（12）United States Patent
Sakhnini et al.

(10) Patent No.: US 12,034,472 B2
(45) Date of Patent: Jul. 9, 2024

(54) BEAM FAILURE RECOVERY PROCEDURE RESOURCE REDUCTION WITH BANDWIDTH PART HOPPING

(71) Applicant: QUALCOMM Incorporated, San Diego, CA (US)

(72) Inventors: Iyab Issam Sakhnini, San Diego, CA (US); Tao Luo, San Diego, CA (US); Yan Zhou, San Diego, CA (US); Jelena Damnjanovic, Del Mar, CA (US); Linhai He, San Diego, CA (US); Wooseok Nam, San Diego, CA (US); Mahmoud Taherzadeh Boroujeni, San Diego, CA (US); Juan Montojo, San Diego, CA (US); Peter Gaal, San Diego, CA (US); Peter Pui Lok Ang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 51 days.

(21) Appl. No.: 17/220,785

(22) Filed: Apr. 1, 2021

(65) Prior Publication Data
US 2021/0314021 A1 Oct. 7, 2021

Related U.S. Application Data

(60) Provisional application No. 63/003,393, filed on Apr. 1, 2020.

(51) Int. Cl.
H04B 1/713 (2011.01)
H04B 7/06 (2006.01)
(Continued)

(52) U.S. Cl.
CPC ........... *H04B 1/713* (2013.01); *H04B 7/0695* (2013.01); *H04W 72/0453* (2013.01); *H04B 7/0617* (2013.01); *H04W 74/0833* (2013.01)

(58) Field of Classification Search
CPC .... H04B 1/713; H04B 7/0695; H04B 7/0617; H04B 1/7143; H04W 72/0453; H04W 74/0833; H04L 5/001; H04L 5/006
See application file for complete search history.

(56) References Cited

U.S. PATENT DOCUMENTS 11,122,642 B2 * 9/2021 Zhou .................... H04L 1/0057
11,917,596 B2 * 2/2024 Jung .................... H04W 24/10
(Continued)

*Primary Examiner* — Ajit Patel
*Assistant Examiner* — Wilfred Thomas
(74) *Attorney, Agent, or Firm* — Holland & Hart LLP

(57) ABSTRACT

Methods, systems, and devices for wireless communications are described. In some systems, a user equipment (UE) and a base station may support beamforming communication techniques and may communicate using one or more beams. The UE may support a bandwidth part (BWP) hopping pattern and may perform a beam failure detection (BFD) procedure across the supported BWPs. While performing the BFD procedure, the UE may declare beam failure and may determine whether to switch to an anchor BWP to initiate a beam failure recover (BFR) procedure or to remain on an active BWP to initiate the BFR procedure. In some implementations, the UE may determine whether to switch to the anchor BWP or to remain on the active BWP to initiate the BFR procedure based on an indication from the base station.

25 Claims, 16 Drawing Sheets

(51) Int. Cl.
*H04W 72/0453* (2023.01)
*H04W 74/0833* (2024.01)

(56) References Cited

U.S. PATENT DOCUMENTS

| | | | |
|---|---|---|---|
| 2019/0166555 A1* | 5/2019 | Cheng | H04B 7/0695 |
| 2019/0253230 A1* | 8/2019 | Loehr | H04W 72/0453 |
| 2019/0306842 A1* | 10/2019 | Cirik | H04B 7/0617 |
| 2019/0357215 A1* | 11/2019 | Zhou | H04L 5/0094 |
| 2019/0357291 A1* | 11/2019 | Zhou | H04W 72/23 |
| 2020/0236566 A1* | 7/2020 | Kou | H04W 24/08 |
| 2020/0252990 A1* | 8/2020 | Ganesan | H04W 76/14 |
| 2020/0404690 A1* | 12/2020 | Lee | H04L 5/0094 |
| 2021/0013950 A1* | 1/2021 | Yang | H04W 72/53 |
| 2021/0067234 A1* | 3/2021 | Guan | H04W 76/19 |
| 2021/0168879 A1* | 6/2021 | Jiang | H04W 72/0453 |
| 2021/0314054 A1* | 10/2021 | Harada | H04L 5/001 |
| 2021/0328650 A1* | 10/2021 | Awad | H04B 7/088 |
| 2021/0399821 A1* | 12/2021 | Chung | H04B 7/0695 |
| 2022/0166581 A1* | 5/2022 | Zhang | H04B 7/0695 |
| 2022/0311577 A1* | 9/2022 | Matsumura | H04L 5/0035 |
| 2022/0337472 A1* | 10/2022 | Turtinen | H04B 7/0408 |

\* cited by examiner

BEAM FAILURE RECOVERY PROCEDURE RESOURCE REDUCTION WITH BANDWIDTH PART HOPPING

CROSS REFERENCE

The present Application for Patent claims the benefit of U.S. Provisional Patent Application No. 63/003,393 by SAKHNINI et al., entitled "BEAM FAILURE RECOVERY PROCEDURE RESOURCE REDUCTION WITH BANDWIDTH PART HOPPING," filed Apr. 1, 2020, assigned to the assignee hereof, and expressly incorporated herein.

FIELD OF TECHNOLOGY

The following relates generally to wireless communications and more specifically to beam failure recovery (BFR) procedure resource reduction with bandwidth part (BWP) hopping.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless communications systems, a UE and a base station may communicate over a communication link using a directional beam. Changes in the radio environment between the UE and the base station may degrade the quality of the beam used by the UE and the base station, which may result in communication failures between the UE and the base station. The UE may attempt to perform a beam failure recovery (BFR) procedure to re-establish a connection with the base station. Some UEs, however, may support communication techniques that may result in a large amount of resources configured at the UE to enable the UE to perform a BFR procedure. In some cases, configuring the UE with a large amount of resources for a BFR procedure may occupy a significant portion of the available memory at the UE.

SUMMARY

The described techniques relate to improved methods, systems, devices, and apparatuses that support beam failure recovery (BFR) procedure resource reduction with bandwidth part (BWP) hopping. Generally, the described techniques provide techniques for a user equipment (UE) supporting a number of BWPs to perform a BFR procedure while maintaining low memory costs and low signaling overhead associated with the BFR procedure. For example, the UE may support beamforming techniques to communicate with a base station across a number of different BWPs. As used herein, the described techniques may use subbands (SBs), sets of resource blocks, or other groupings or sets of frequency resources instead of or in addition to BWPs, consistent with the disclosure. The UE may perform beam failure detection (BFD) procedures across the number of different BWPs to determine whether a current beam satisfies a threshold signal strength at the UE. During a BFD procedure, the UE may determine that a set of reference signals (or a number of sets of reference signals) fail to satisfy a threshold signal strength a threshold number of times and, accordingly, may determine that a current beam has failed.

Upon declaration of beam failure, the UE may determine whether to switch to an anchor (or default) BWP or to remain on the active BWP to perform a BFR procedure. In some examples, the UE may receive signaling from the base station that may provide an indication to switch to the anchor BWP to perform the BFR procedure. In some other examples, the UE may determine to switch to the anchor BWP to perform the BFR procedure based on an implicit indication from the base station. For example, the base station may configure a BWP (e.g., the anchor BWP) with resources and parameters for performing the BFR procedure (i.e., BFR parameters) and may refrain from configuring a number of other BWPs supported by the UE with BFR parameters. In such examples, the UE may determine to switch to the anchor BWP to perform the BFR procedure based on determining that the UE has been configured with BFR parameters for the anchor BWP and is absent of BFR parameters for the other BWPs that the UE may support.

Accordingly, the UE may switch to the anchor BWP and may perform the BFR procedure to identify a new beam that satisfies a threshold signal strength. In some examples, the UE may perform the BFR procedure upon expiration of a time gap during which the UE may switch to the anchor BWP, which may be referred to as a switch gap. The switch gap may be configured to provide the UE time to switch from the BWP at which the beam failure was declared to the anchor BWP that the UE may use to perform the BFR procedure. During the BFR procedure, the UE may measure a set of reference signals associated with a set of beams that have resources configured for the anchor BWP and may select a beam from the set of beams associated with a reference signal that is received at the UE with a signal strength satisfying the threshold signal strength. The UE may use the selected beam to transmit a message to the base station to re-establish a connection with the base station. The UE may transmit the message, which may be a random access message, over a random access channel (RACH) configured for the anchor BWP. The base station may transmit a downlink message to the UE responsive to the random access message from the UE during a random access response (RAR) window. In some cases, the UE may monitor for the message from the base station over a control resource set (CORESET) of a physical downlink control channel (PDCCH) configured for the anchor BWP. The UE may determine, based on receiving the downlink message from the base station, that the base station successfully received the message from the UE. As such, the UE and the base station may re-establish a communication link with the selected beam.

A method for wireless communication at a UE is described. The method may include switching between a set of BWPs configured for the UE to communicate with a base station, the set of BWPs including at least a first BWP and a second BWP, determining a beam failure while communicating with the base station using the first BWP according to the switching, transitioning, based on the determined beam failure, from the first BWP to the second BWP, and performing, using the second BWP, a BFR procedure based on the determined beam failure.

An apparatus for wireless communication at a UE is described. The apparatus may include a processor, memory coupled with the processor, and instructions stored in the memory. The instructions may be executable by the processor to cause the apparatus to switch between a set of BWPs configured for the UE to communicate with a base station, the set of BWPs including at least a first BWP and a second BWP, determine a beam failure while communicating with the base station using the first BWP according to the switching, transition, based on the determined beam failure, from the first BWP to the second BWP, and perform, using the second BWP, a BFR procedure based on the determined beam failure.

Another apparatus for wireless communication at a UE is described. The apparatus may include means for switching between a set of BWPs configured for the UE to communicate with a base station, the set of BWPs including at least a first BWP and a second BWP, determining a beam failure while communicating with the base station using the first BWP according to the switching, transitioning, based on the determined beam failure, from the first BWP to the second BWP, and performing, using the second BWP, a BFR procedure based on the determined beam failure.

A non-transitory computer-readable medium storing code for wireless communication at a UE is described. The code may include instructions executable by a processor to switch between a set of BWPs configured for the UE to communicate with a base station, the set of BWPs including at least a first BWP and a second BWP, determine a beam failure while communicating with the base station using the first BWP according to the switching, transition, based on the determined beam failure, from the first BWP to the second BWP, and perform, using the second BWP, a BFR procedure based on the determined beam failure.

Some examples of the method, apparatuses, and non-transitory computer-readable medium described herein may further include operations, features, means, or instructions for receiving a configuration indicating that the UE may be to transition to the second BWP to perform the BFR procedure.

In some examples of the method, apparatuses, and non-transitory computer-readable medium described herein, the configuration includes an indicator of a first mode of a set of modes, where the first mode indicates that the UE may be to transition to the second BWP to perform the BFR procedure, and where a second mode of the set of modes indicates that the UE may be to perform the BFR procedure on the first BWP based on the first BWP being an active BWP for the UE when the beam failure was determined.

In some examples of the method, apparatuses, and non-transitory computer-readable medium described herein, the configuration includes a first configuration for the first BWP and a second configuration for the second BWP, the second configuration including an indication of one or more of a set of beams for beam recovery, a set of resources for a random access procedure, or a recovery search space of a CORESET.

In some examples of the method, apparatuses, and non-transitory computer-readable medium described herein, the first configuration lacks the indication the set of beams for beam recovery, the set of resources for the random access procedure, and the recovery search space of the CORESET.

Some examples of the method, apparatuses, and non-transitory computer-readable medium described herein may further include operations, features, means, or instructions for receiving a configuration for the set of BWPs for the UE, and determining, based on identifying that the received configuration indicates beam failure parameters for the second BWP, that the UE may be to transition to the second BWP to perform the BFR procedure.

Some examples of the method, apparatuses, and non-transitory computer-readable medium described herein may further include operations, features, means, or instructions for identifying that the received configuration fails to indicate beam failure parameters for the first BWP, where determining that the UE may be to transition to the second BWP to perform the BFR procedure may be further based on identifying that the received configuration fails to indicate beam failure parameters for the first BWP.

Some examples of the method, apparatuses, and non-transitory computer-readable medium described herein may further include operations, features, means, or instructions for starting a timer associated with the BFR procedure based on the transitioning from the first BWP to the second BWP.

In some examples of the method, apparatuses, and non-transitory computer-readable medium described herein, the transitioning from the first BWP to the second BWP may be performed after expiry of a timer associated with beam failure detection, the timer associated with the BFR procedure started after the expiry of the timer associated with the beam failure detection and a beam switching gap duration.

Some examples of the method, apparatuses, and non-transitory computer-readable medium described herein may further include operations, features, means, or instructions for identifying a hopping pattern for the set of BWPs configured for the UE, where the hopping pattern indicates a set of a time periods during which a different BWP of the set of BWPs may be used by the UE to communicate with the base station, and where the switching between the set of BWPs may be according to the identified hopping pattern.

In some examples of the method, apparatuses, and non-transitory computer-readable medium described herein, determining the beam failure may include operations, features, means, or instructions for counting, while communicating the base station using the set of BWPs according to the switching, a number of instances of beam failure for beams associated with the set of BWPs, identifying that the counted number of instances of the beam failure satisfies a threshold value, and determining the beam failure associated with the set of BWPs based on the counted number of instances of the beam failure satisfying the threshold value.

In some examples of the method, apparatuses, and non-transitory computer-readable medium described herein, performing the BFR procedure using the second BWP may include operations, features, means, or instructions for measuring a signal quality of one or more reference signals of a set of one or more beams for beam recovery, selecting, based on the measured signal quality of the one or more reference signals, a beam of the set of one or more beams, transmitting, on the selected beam, a preamble the BFR procedure, and receiving, in response to the transmitted signal, a response of the BFR procedure.

A method for wireless communication at a base station is described. The method may include transmitting, to a UE, a configuration identifying a set of BWPs for the UE to use to communicate with the base station by switching between the set of BWPs, the set of BWPs including at least a first BWP and a second BWP, and the configuration indicating that the UE is to transition to the second BWP to perform a BFR procedure, receiving, from the UE on an occasion associated with the second BWP, a preamble of the BFR procedure, and determining, based on receiving the preamble on the occasion associated with the second BWP, that a beam failure has occurred at the UE.

An apparatus for wireless communication at a base station is described. The apparatus may include a processor, memory coupled with the processor, and instructions stored in the memory. The instructions may be executable by the processor to cause the apparatus to transmit, to a UE, a configuration identifying a set of BWPs for the UE to use to communicate with the base station by switching between the set of BWPs, the set of BWPs including at least a first BWP and a second BWP, and the configuration indicating that the UE is to transition to the second BWP to perform a BFR procedure, receive, from the UE on an occasion associated with the second BWP, a preamble of the BFR procedure, and determine, based on receiving the preamble on the occasion associated with the second BWP, that a beam failure has occurred at the UE.

Another apparatus for wireless communication at a base station is described. The apparatus may include means for transmitting, to a UE, a configuration identifying a set of BWPs for the UE to use to communicate with the base station by switching between the set of BWPs, the set of BWPs including at least a first BWP and a second BWP, and the configuration indicating that the UE is to transition to the second BWP to perform a BFR procedure, receiving, from the UE on an occasion associated with the second BWP, a preamble of the BFR procedure, and determining, based on receiving the preamble on the occasion associated with the second BWP, that a beam failure has occurred at the UE.

A non-transitory computer-readable medium storing code for wireless communication at a base station is described. The code may include instructions executable by a processor to transmit, to a UE, a configuration identifying a set of BWPs for the UE to use to communicate with the base station by switching between the set of BWPs, the set of BWPs including at least a first BWP and a second BWP, and the configuration indicating that the UE is to transition to the second BWP to perform a BFR procedure, receive, from the UE on an occasion associated with the second BWP, a preamble of the BFR procedure, and determine, based on receiving the preamble on the occasion associated with the second BWP, that a beam failure has occurred at the UE.

In some examples of the method, apparatuses, and non-transitory computer-readable medium described herein, the configuration includes an indicator of a first mode of a set of modes, where the first mode indicates that the UE may be to transition to the second BWP to perform the BFR procedure, and where a second mode of the set of modes indicates that the UE may be to perform the BFR procedure on the first BWP based on the first BWP being an active BWP for the UE when the beam failure was determined.

In some examples of the method, apparatuses, and non-transitory computer-readable medium described herein, the configuration includes a first configuration for the first BWP and a second configuration for the second BWP, the second configuration including an indication of one or more of a set of beams for beam recovery, a set of resources for a random access procedure, or a recovery search space of a CORESET.

In some examples of the method, apparatuses, and non-transitory computer-readable medium described herein, the first configuration lacks the indication the set of beams for beam recovery, the set of resources for the random access procedure, and the recovery search space of the CORESET.

In some examples of the method, apparatuses, and non-transitory computer-readable medium described herein, the transmitted configuration indicates that the UE may be to transition to the second BWP to perform the BFR procedure by indicating beam failure parameters for the second BWP in the transmitted configuration.

In some examples of the method, apparatuses, and non-transitory computer-readable medium described herein, the transmitted configuration further indicates that the UE may be to transition to the second BWP to perform the BFR procedure by failing to indicate beam failure parameters for the first BWP.

Some examples of the method, apparatuses, and non-transitory computer-readable medium described herein may further include operations, features, means, or instructions for transmitting an indication of a hopping pattern for the set of BWPs, where the hopping pattern indicates a set of a time periods during which a different BWP of the set of BWPs may be used by the UE to communicate with the base station, and where the switching between the set of BWPs may be according to the identified hopping pattern.

DETAILED DESCRIPTION

Figure 1:
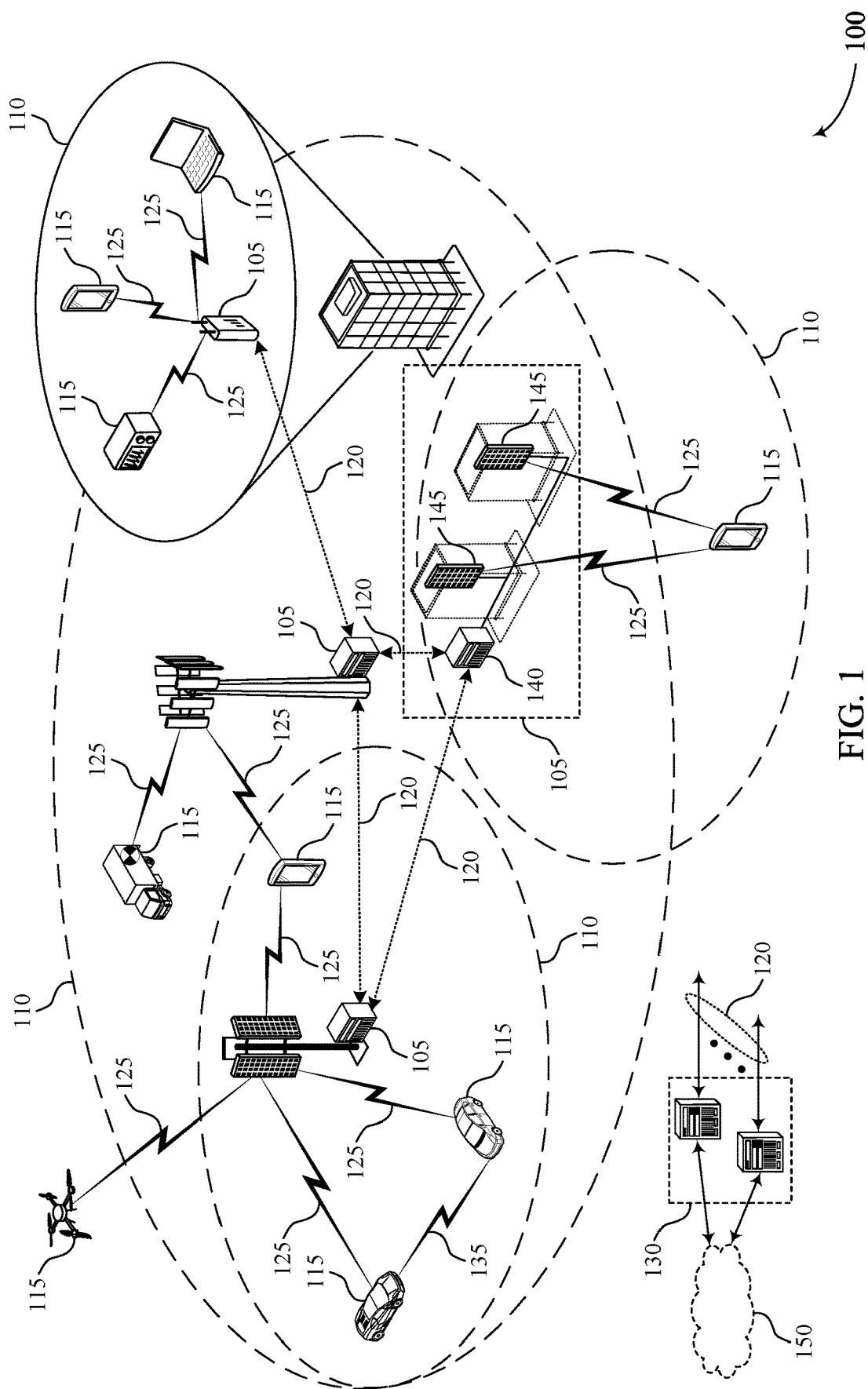
FIG. 1 illustrates an example of a wireless communications system that supports beam failure recovery (BFR) procedure resource reduction with bandwidth part (BWP) hopping in accordance with aspects of the present disclosure.

Wireless communications systems may support communication links between wireless devices (e.g., such as a base station and a user equipment (UE)), such that wireless devices may communicate in radio frequency spectrum bands. For example, a base station and a UE may operate over a carrier bandwidth. In some cases, wireless communications systems (e.g., a base station) may divide the carrier bandwidth into multiple (e.g., up to two or four) bandwidth parts (BWPs) that may be used for communication with a UE. As used herein, the described techniques may use subbands (SBs), sets of resource blocks, or other groupings or sets of frequency resources (e.g., of a carrier bandwidth) instead of or in addition to BWPs, consistent with the disclosure. Each BWP may include a contiguous set of resource blocks on a carrier bandwidth, and different BWPs may or may not be contiguous in frequency (e.g., a BWP may be adjacent in frequency to another BWP, or a BWP may have gaps or guard bands to adjacent BWPs). In some cases, BWPs may be configured with different properties (e.g., protocol features, numerologies, modulation schemes, physical channels, etc.). Further, in some cases, BWPs may be defined for some carriers (e.g., a New Radio (NR) carrier may define up to four NR BWPs, and each NR BWP may have some defined bandwidth, set of properties/parameters, etc.). In some aspects, a UE and a base station may support beamforming communication techniques and, accordingly, may perform beam failure detection (BFD) procedures and beam failure recovery (BFR) procedures to maintain a reliable communication link. In some cases, each BWP may be configured with different resources for BFD and BFR procedures.

Further, some wireless communications systems may support reduced capability UEs. A reduced capability UE (e.g., a low tier UE, an NR-light UE, etc.) may operate with one or more of a reduced transmit power, a reduced number of transmit or receive antennas, a reduced transmit or receive bandwidth, or a reduced computational complexity. For example, a reduced capability UE may be a smart wearable device, an industrial sensor, a video surveillance device, etc. As such, some reduced capability UEs may implement narrow BWPs (NBWPs) to reduce BWP bandwidth and support complexity reduction features. In some cases, however, communication over narrower BWPs may be more susceptible to interference due to narrower frequency constraints in which a UE may transmit or receive. Thus, to maintain network reliability and robustness, some UEs implementing NBWPs may further employ BWP hopping (e.g., NBWP hopping) techniques, such that a UE may switch from one BWP to another BWP while communicating with a base station.

A UE implementing BWP hopping may support a large number of operable BWPs (e.g., NBWPs), each of which may be configured with different properties and resources, including BFR parameters. Accordingly, a base station may configure the UE with a large number of BFR parameters, or BFR resources, which may become expensive to store at the UE. In some examples of the techniques described herein, the base station may configure an anchor BWP with BFR parameters, and the UE may use the anchor BWP to perform a BFR procedure. In some specific examples, the base station may exclusively configure the anchor BWP with BFR parameters (e.g., the base station may refrain from configuring other BWPs supported by the UE with BFR parameters). As such, the UE may store fewer BFR parameters (e.g., the UE may store a single set of BFR parameters associated with a single BWP), which may reduce the memory cost of BFR procedures and may reduce signaling overhead associated with configuring a multitude of BWPs supported by the UE with BFR parameters. The UE, prior to performing a BFR procedure, may switch from an active BWP at which a beam failure was detected to the anchor BWP that is configured with BFR parameters, and the UE may use the anchor BWP to perform the BFR procedure to re-establish reliable communications with the base station.

The UE may determine to switch to the anchor BWP based on explicit signaling from the base station, such as an explicit indication from the base station of the anchor BWP that the UE may use to perform BFR procedures. Additionally or alternatively, the UE may determine to switch to the anchor BWP based on an implicit indication from the base station or based on an implicit rule configured at the UE. For example, the UE may determine to use an anchor BWP to perform BFR procedures based on identifying that one BWP (e.g., the anchor BWP) of the BWPs supported by the UE is configured with BFR parameters for performing a BFR procedure. In either implementation, the UE may switch to the anchor BWP and perform the BFR procedure after a switch gap.

Particular aspects of the subject matter described herein may be implemented to realize one or more potential advantages. The described techniques may support improvements in memory storage at reduced capability devices supporting a number of BWPs, such as NBWPs. For example, the described techniques may enable a UE to store BFR parameters for a single BWP (e.g., an anchor BWP), instead of for a number of BWPs supported by the UE. Further, the examples described herein may reduce signaling overhead from a base station based on configuring a single BWP with BFR parameters (instead of configuring all BWPs supported by the UE with BFR parameters). Moreover, the implementations of the present disclosure may support higher data rates, greater UE and network capacity, and greater spectral efficiency based on or as a result of more efficient resource usage associated with BFR procedures.

Aspects of the disclosure are initially described in the context of wireless communications systems. Aspects of the disclosure are also described in the context of communication timelines. Aspects of the disclosure are further illustrated by and described with reference to apparatus diagrams, system diagrams, and flowcharts that relate to BFR procedure resource reduction with BWP hopping.

FIG. 1 illustrates an example of a wireless communications system 100 that supports BFR procedure resource reduction with BWP hopping in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a geographic coverage area 110 over which the UEs 115 and the base station 105 may establish one or more communication links 125. The geographic coverage area 110 may be an example of a geographic area over which a base station 105 and a UE 115 may support the communication of signals according to one or more radio access technologies.

The UEs 115 may be dispersed throughout a geographic coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a BWP) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, sometimes in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information (CSI) reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some cases, a UE 115 may implement BWP hopping to improve reliability and robustness of wireless communication with a base station 105. Further, the UE 115 and the base station 105 may support beamforming communication techniques and may transmit and receive using a directional beam. By beamforming transmissions, the UE 115 and the base station 105 may enhance the received strength or quality of a signal, which may increase the likelihood of successful communication between the UE 115 and the base station 105.

In some cases, the signal strength or quality associated with a beam may be dependent on the radio environment between the UE 115 and the base station 105. For example, changes in the radio environment between the UE 115 and the base station 105 may influence the received strength or quality of a beamformed transmission. Changes may include movement of the UE 115 or the presence of an obstacle between the UE 115 and the base station 105, among other examples. In some cases, changes in the radio environment between the UE 115 and the base station 105 may result in a degradation of the received signal strength or quality of beamformed transmissions, which may result in an increase in communication failures between the UE 115 and the base station 105. For instance, the base station 105 may transmit a directional beam to the UE 115 based on an initial location of the UE 115, and if the UE 115 moves a threshold distance away from the initial position the directional beam that the base station 105 uses to transmit to the UE 115 may no longer be directed toward the UE 115, which may result in low signal strength and quality at the UE 115. To maintain reliable communications between the UE 115 and the base station 105, the UE 115 may perform BFD procedures to determine whether a current beam (or a current set of beams) are able to provide signals that satisfy a threshold signal strength or quality at the UE 115.

In some cases, the UE 115 may employ a BWP hopping technique, such as NBWP hopping, and each operable BWP supported by the UE 115 may be associated with a set of directional beams for communication with the base station 105. The UE 115 may measure reference signals associated with the set of directional beams configured for each BWP to determine whether the set of beams are able to provide signals that satisfy the threshold signal strength or quality at the UE 115. In some cases, the UE 115 may determine that the set of beams of a BWP, or a number of sets of beams of a number of BWPs, are unable to provide signals that satisfy the threshold signal strength at the UE. In some implementations of the present disclosure, the UE may declare that beam failure has occurred and may switch to an anchor BWP to perform a BFR procedure. The anchor BWP may be configured with a set of BFR parameters, including resources associated with a set of candidate beams and resources for link re-establishment messages, that the UE 115 may use to determine a beam to use for re-establishing the failed communication link between the UE 115 and the base station 105.

Figure 2:
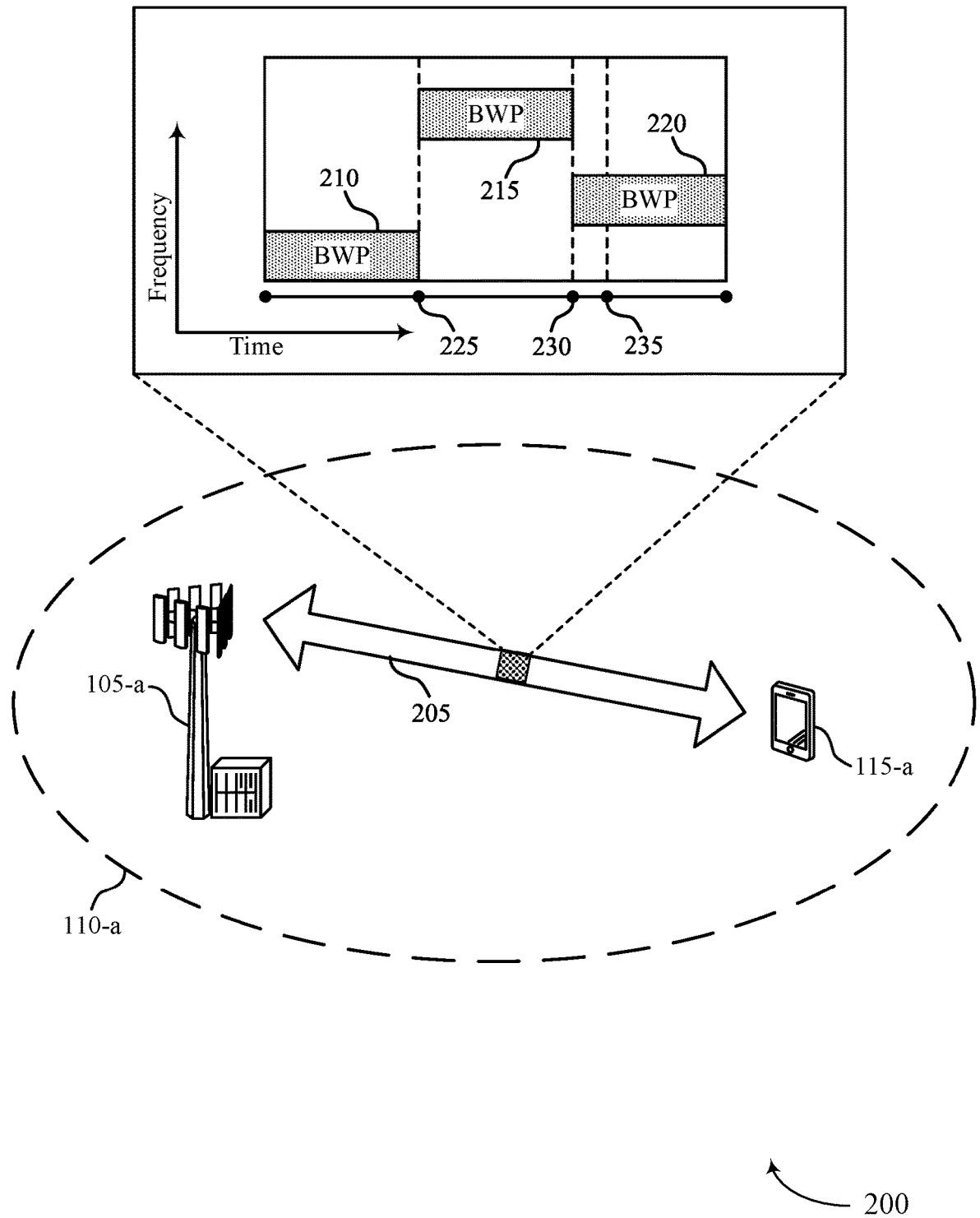
FIG. 2 illustrates an example of a wireless communications system that supports BFR procedure resource reduction with BWP hopping in accordance with aspects of the present disclosure.

FIG. 2 illustrates an example of a wireless communications system 200 that supports BFR procedure resource reduction with BWP hopping in accordance with aspects of the present disclosure. In some examples, the wireless communications system 200 may implement aspects of the wireless communications system 100. The wireless communications system 200 may include a UE 115-*a* and a base station 105-*a*, which may be examples of corresponding devices described herein, including with reference to FIG. 1. The UE 115-*a* and the base station 105-*a* may support beamformed transmissions across a communication link 205. As described herein, the UE 115-*a* may additionally support BWP hopping and, accordingly, may hop between a number of different BWPs over time. In the event of a beam failure, the UE 115-*a* may perform a BFR procedure. In some examples, the base station 105-*a* may configure an anchor BWP with resources that the UE 115-*a* may use to perform the BFR procedure and may refrain from configuring BFR parameters for other BWPs supported by the UE 115-*a*, which may reduce memory costs associated with storing configured BFR parameters. In such examples, the UE 115-*a* may switch to the anchor BWP to perform the BFR procedure.

In some cases, the wireless communications system 200 may support reduced capability UEs. For example, the UE 115-*a* may be an example of a reduced capability UE. In such examples, the UE 115-*a* (e.g., a low tier UE, a NR-light UE, a RedCap UE, etc.) may operate with one or more of a reduced transmit power, a reduced number of transmit or receive antennas, a reduced transmit/receive bandwidth, or reduced computational complexity. The UE 115-*a* may be a smart wearable device, an industrial sensor, or a video surveillance device, among other examples. As such, the UE 115-*a* may implement NBWPs to reduce BWP bandwidth and support complexity (e.g., bandwidth) reduction features. In some cases, the UE 115-*a* may feature reduced power consumption and conserve computational resources by reducing an operating bandwidth. For example, the UE 115-*a* may transition to a NBWP based on reduced amounts of data to be transferred, less frequent data transfers, and the like, and thus may reduce bandwidth and power consumption during communication with the base station 105-*a* (e.g., a primary cell or a primary secondary cell, among other examples).

In some cases, however, transmissions to or from the UE 115-*a* may be more susceptible to interference due to the narrower frequency constraints in which the UE 115-*a* operates. For instance, some frequency bands may experience greater levels of interference than others, and the UE 115-*a*, operating on an NBWP, may have less flexibility to separate its communications in frequency from a frequency band associated with high levels of interference. In other words, the UE 115-*a* may experience persistent interference on a part of the bandwidth (e.g., part of the component carrier bandwidth) used by the UE 115-*a*. Thus, in some cases, to maintain network reliability and robustness, the UE 115-*a* may further employ BWP hopping (e.g., NBWP hopping) techniques. At 225, for example, the UE 115-*a* may hop or switch from a BWP 210 to a BWP 215 to achieve a greater range of frequency diversity. As such, the UE 115-*a* may avoid persistent interference associated with one part of the bandwidth in which the UE 115-*a* communicates. Although hopping between two BWPs is shown, the techniques described herein may equally apply to hopping between any number of BWPs. Further, the BWP 210 and the BWP 215 may be adjacent or may be separated (e.g., by a gap or a guard band) in frequency.

To further increase the likelihood of successful communications over the communication link 205, the UE 115-*a* and the base station 105-*a* may support beamforming communication techniques and may transmit and receive using a directional beam. By beamforming transmissions, the UE 115-*a* and the base station 105-*a* may enhance the received strength or quality of a signal, which may increase the likelihood of successfully receiving and decoding the signal at the UE 115-*a* or the base station 105-*a*. In some cases, however, changes in the radio environment between the UE 115-*a* and the base station 105-*a* may adversely affect the quality of a beam used by the UE 115-*a* and the base station 105-*a*. For example, changes in the radio environment between the UE 115-*a* and the base station 105-*a*, such as movement of the UE 115-*a* or the presence of an obstacle between the UE 115-*a* and the base station 105-*a*, may degrade the received strength or quality of a beamformed transmission, which may result in communication failures between the UE 115-*a* and the base station 105-*a*.

To maintain a reliable directional beam for communications between the UE 115-*a* and the base station 105-*a*, the UE 115-*a* may perform BFD procedures to determine whether an active beam (or an active set of beams) is able to provide signals that satisfy a threshold signal strength at the UE 115-*a*. For example, the UE 115-*a* may be configured with a set of resources for receiving a set of reference signals (each corresponding to a beam) for each BWP supported by the UE 115-*a*. The UE 115-*a* may periodically measure the signal strength of the reference signals by monitoring the configured reference signal resources and may compare the measured signal strengths to a threshold signal strength to determine whether at least one beam of an active set of beams is able to provide a signal that satisfies the threshold signal strength at the UE 115-*a*. For instance, the UE 115-*a* may compare a reference signal received strength (RSRP) associated with each beam (e.g., an RSRP associated with a reference signal corresponding to each beam) to the threshold signal strength. Such a procedure may be referred to as a BFD procedure and is described in more detail with reference to FIGS. 3 and 4.

At 230, the UE 115-*a* may, in some cases, determine that the set of active beams is unable to provide a signal strength that satisfies the threshold signal strength at the UE 115-*a* and the UE 115-*a* may declare beam failure. In such cases, the UE 115-*a* may begin a BFR procedure to re-establish communications with the base station 105-*a* with a new beam. In some examples, the UE 115-*a* may determine whether to switch to an anchor BWP 220 or to remain on the BWP 215 to perform the BFR procedure. For example, the UE 115-*a* may receive an indication from the base station 105-*a* that the UE 115-*a* may use the anchor BWP 220 for the BFR procedure. Additionally or alternatively, the UE 115-*a* may determine whether to use the anchor BWP 220 or to remain on the BWP 215 based on an implicit rule configured at the UE 115-*a*. For example, the UE 115-*a* may determine that a single BWP of the BWPs supported by the UE 115-*a* is configured with BFR parameters and, accordingly, may determine that the BWP configured with BFR parameters is the anchor BWP 220 that the UE 115-*a* may use to perform the BFR procedure. For instance, the UE 115-*a* may determine that the anchor BWP 220 is configured with BFR parameters for the BFR procedure and that the BWP 210 and the BWP 215 are absent of configured BFR parameters. In some cases, the base station 105-*a* may configure the anchor BWP 220 with BFR parameters using radio resource control (RRC) signaling.

In some examples, the anchor BWP 220 may be one of the BWPs between which the UE 115-*a* hops/switches. For example, the UE 115-*a* may hop or switch between the BWP 210, the BWP 215, and the BWP 220 to achieve a greater range of frequency diversity, and one of the BWPs (e.g., the BWP 220) may be the anchor BWP.

In some implementations, the UE 115-*a* may determine to switch to the anchor BWP 220 to perform the BFR procedure. In such implementations, the UE 115-*a* may switch to the anchor BWP 220 upon declaration of beam failure and may perform the BFR procedure once the active BWP of the UE 115-*a* is the anchor BWP 220. In some examples, to provide time for the UE 115-*a* to switch from the BWP 215 to the anchor BWP 220, the UE 115-*a* may perform the BFR procedure a time delay (e.g., a switch gap) after the beam failure was declared by the UE 115-*a*. For example, the UE 115-*a* may declare beam failure at 230 and may delay the start of the BFR procedure until 235, during which time the UE 115-*a* may switch from the BWP 215 to the anchor BWP 220.

Accordingly, the UE 115-*a* may perform the BFR procedure on the anchor BWP 220 to re-establish a communication link with the base station 105-*a* using a new beam, as described in more detail with reference to FIGS. 3 and 4. By configuring the UE 115-*a* to switch to the anchor BWP 220 prior to performing the BFR procedure, the base station 105-*a* may configure fewer sets of BFR parameters at the UE 115-*a*, which may reduce signaling overhead from the base station 105-*a* as well as save memory at the UE 115-*a*. The described techniques may be applicable to communication between the UE 115-*a* and the base station 105-*a* in a variety of different transmissions modes, such as a non-discontinuous reception (DRX) mode.

Figure 3:
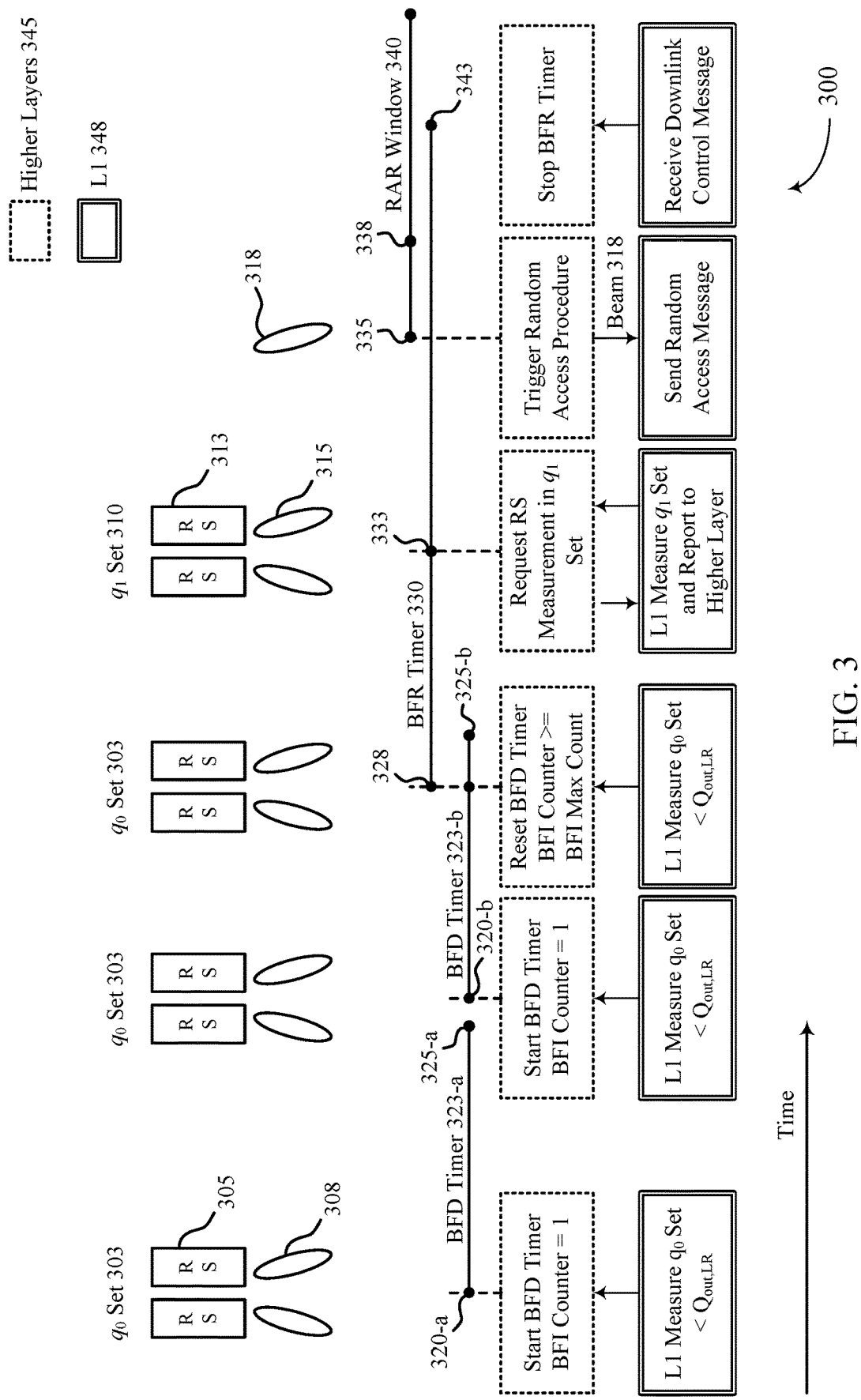
FIG. 3 illustrates an example of a communication timeline that supports BFR procedure resource reduction with BWP hopping in accordance with aspects of the present disclosure.

FIG. 3 illustrates an example of a communication timeline 300 that supports BFR procedure resource reduction with BWP hopping in accordance with aspects of the present disclosure. In some examples, the communication timeline 300 may implement aspects of the wireless communications system 100 or the wireless communications system 200. The communication timeline 300 may illustrate communications at a UE 115, which may be an example of corresponding devices described herein, including with reference to FIGS. 1 and 2. The UE 115 may support beamforming techniques and may measure set of reference signals at configured resources associated with an active BWP of the UE 115 to determine whether a current beam (or a current set of beams) used by the UE 115 satisfies a threshold signal strength or a threshold link quality. The UE 115 may communicate using beamformed transmissions with a base station 105, which may be an example of corresponding devices described herein, including with reference to FIGS. 1 and 2. The communication timeline 300 may illustrate how a UE 115 may trigger a BFR procedure and re-establish a communication link with a base station 105 after determining that a beam between the UE 115 and the base station 105 has failed.

In some cases, BFD and BFR procedures may involve communication between a layer 1 (L1) 348 of the UE 115 and higher layers 345 of the UE 115. The higher layers 345 of the UE 115 may refer to a layer 2 (L2), a MAC layer, an RLC layer, or an RRC layer, among other examples. For example, the UE 115, at the L1 348, may periodically measure the signal strength of a set of reference signals received within a $q_0$ set 303 of reference signal resources 305 that are configured for each BWP supported by the UE 115. Each reference signal associated with reference signal resources 305 in the $q_0$ set 303 may be associated with a beam 308 that the UE 115 and the base station 105 may use for directional transmissions. In some cases, the set of reference signals may be CSI-RSs or synchronization signal blocks (SSBs). The UE 115, at the L1 348, may compare the measured signal strength (e.g., the RSRP) of each reference signal to a first threshold (e.g., a threshold signal strength or signal quality), which may be referred to as $Q_{out,LR}$. In some cases, the first threshold $Q_{out,LR}$ may be associated with an out-of-synch threshold. If the UE 115 measures a number of the reference signals (e.g., all of the reference signals) with a received signal strength below the first threshold, the L1 348 may provide an indication of a beam failure instance (BFI) to the higher layers 345 of the UE 115. In some cases, the UE 115 may provide BFI indications with a periodicity associated with the maximum or greater between 2 milliseconds (ms) and the smallest periodicity of transmissions of the reference signals associated with the beams 308. For instance, BFI indication period=max {2 ms, smallest CSI-RS/SSB periodicity.

At 320-*a*, for example, the UE 115, at the L1 348, may determine that a number (e.g., all) of the reference signals (e.g., all of the reference signals received via the $q_0$ set 303 of reference signal resources 305) fail to satisfy the first threshold and the UE 115, via the L1 348, may transmit an indication of the BFI to the higher layers 345 of the UE 115. The higher layers 345 may maintain a BFI counter and, upon receiving the BFI from the L1 348, may set the BFI counter to 1. In some cases, the higher layers 345 may maintain the BFI counter as a value in a higher layer BFI_COUNTER parameter.

Additionally, the higher layers 345 may start a BFD timer 323 (e.g., BFD timer 323-*a*). The higher layers 345 may manage the accumulation of BFIs by using the BFD timer 323. For example, the higher layers 345 may use the BFD timer 323 to avoid counting BFIs for too long a duration, which may result in erroneous beam failure declarations. In some cases, the BFD timer 323 may be pre-configured at the UE 115. For example, the UE 115-*a* (e.g., at the higher layers 345) may set the BFD timer 323 based on a value of a beamFailureDetectionTimer parameter. In some cases, the higher layers 345 may reset the BFD timer 323 every time the higher layers 345 receive an indication of a BFI and may reset the BFI counter if the BFD timer 323 expires. Accordingly, the higher layers 345 may continue to accumulate BFIs in the BFI counter if the L1 348 indicates a BFI with a shorter periodicity than the duration of the configured BFD timer 323.

As illustrated in FIG. 3, the higher layers 345 may start a BFD timer 323-*a* at 320 and the BFD timer 323-*a* may expire at 325-*a* before the L1 348 of the UE 115-*a* indicates a threshold number of BFIs (e.g., a number of BFIs greater than or equal to a pre-configured maximum or upper limit count of BFIs). As such, the higher layers 345 may reset the BFI counter to zero and restart the BFD procedure upon reception of another BFI from the L1 348. At 320-*b*, for example, the L1 348 may determine that all of the reference signals fail to satisfy the first threshold (e.g., $Q_{out,LR}$) and may transmit an indication of a BFI to the higher layers 345. Accordingly, the higher layers 345 may increment the BFI counter to 1 and start a BFD timer 323-*b* that may be set to expire at 325-*b*. However, prior to the expiration of the BFD timer 323-*b* (which may be reset every time the higher layers 345 increment the BFI counter), the higher layers 345 may determine that the BFI counter is greater than or equal to a pre-configured maximum count of BFIs. At 328, for example, the higher layers 345 may determine that the BFI counter is greater than or equal to beamFailureInstanceMax-Count (e.g., the maximum count of BFIs). The maximum count of BFIs may be associated with (e.g., may be correlated with) a number of BFIs that may indicate that the beam strength or quality between the UE 115 and the base station 105 fails to satisfy a threshold beam strength or quality, which may result in an increase in communication failures.

Accordingly, the UE 115 may declare beam failure and may begin a BFR procedure upon declaring beam failure (e.g., at 328) to re-establish a communication link with the base station 105 using a new beam. In some cases, the UE 115 may initiate a BFR timer 330 during which the UE 115 may perform the BFR procedure. The BFR timer 330 may be associated with a pre-configured duration. For instance, the UE 115 may configure the BFR timer 330 according to a beamFailureRecoveryTimer parameter. Upon initiating the BFR timer 330, the UE 115 (e.g., at the higher layers 345) may initiate the BFR procedure by determining to measure a number of reference signals associated with a set of candidate beams 315.

For example, the UE 115 may identify a pre-configured $q_1$ set 310 of candidate beams 315 from which the UE 115 may select a new beam, such as beam 318. Each candidate beam 315 of the $q_1$ set 310 may be associated with a reference signal, such as a CSI-RS or an SSB, which the UE 115 may receive in pre-configured reference signal resources 313. In some cases, a $q_1$ set 310 of candidate beams 315 and reference signal resources 313 may be configured at the UE 115 for each BWP supported by the UE 115. As such, the UE 115 may be able to perform BFR procedures on any BWP. The reference signal resources 313 may be different for each BWP supported by the UE 115, however, such that the number of configured $q_1$ sets 310 of candidate beams 315 and the amount of configured reference signal resources 313 may occupy a significant portion of the memory of the UE 115 and may likewise be associated with a high memory cost.

At 333, the higher layers 345 of the UE 115 may request the UE 115, at the L1 348, to measure the signal strength or signal quality of the reference signals. Accordingly, the UE 115, at the L1 348, may measure the reference signals and may report the measured signal strengths of each of the reference signals to the higher layers 345. The higher layers 345 may compare the signal strengths associated with each of the reference signals to a second threshold (e.g., a threshold signal strength or signal quality), which may be referred to as $Q_{in,LR}$. The higher layers 345 may determine, based on the comparison, which of the reference signals was received by the UE 115 with a sufficient signal strength to support communications between the UE 115 and the base station 105. The higher layers 345 may select a candidate beam 315 associated with one of the reference signals that satisfies (e.g., exceeds) the second threshold. In some cases, the higher layers 345 may select a candidate beam 315 corresponding to the reference signal that the UE 115 received with the greatest signal strength. Alternatively, the higher layers 345 may select a candidate beam 315 corresponding to a reference signal that satisfies the second threshold for various other reasons.

At 335, in some cases, the higher layers 345 may select the beam 318 from the set of candidate beams 315 for the UE 115 to use for communication with the base station 105. The higher layers 345 may trigger a random access procedure, such as a random access channel (RACH) procedure, at the UE 115 by indicating the UE 115, via the L1 348, to send a random access message associated with the beam 318 (e.g., using the beam 318). In some cases, the higher layers 345 may provide an indication of the selected beam 318 to the L1 348 along with the request to transmit the random access message. In some aspects, the selected beam 318 may be referred to as $q_{new}$.

The UE 115 may attempt to re-establish a communication link with the base station 105 by transmitting the random access message to the base station 105 using the beam 318. In some cases, the UE 115 may transmit the random access message in a RACH, such as a physical RACH (PRACH), and, likewise, the random access message may be referred to as a RACH message. As a result of being pre-configured with the $q_1$ set 310 of candidate beams 315, the UE 115 may transmit the random access message in a contention-free environment (e.g., using a contention-free random access (CFRA) procedure). Likewise, the resources of the PRACH that the UE 115 uses to transmit the random access message may be dedicated for the BFR procedure at the UE 115 and may be unique to the active BWP of the UE 115. The UE 115 may determine the PRACH resource to use for the random access message based on a value of PRACH-ResourceDedicatedBFR. In some cases, the UE 115 may be configured with different PRACH resources for each BWP supported by the UE 115 to enable the UE 115 to perform a BFR procedure from any BWP. The UE 115 may support a number of BWPs, however, which may result in a large amount of PRACH resources configured at the UE 115.

In some cases, the beam 318 may be associated with a dedicated preamble and the random access message may include the dedicated preamble. As such, the base station 105 may determine, based on receiving the random access message with the beam-specific dedicated preamble, that a beam failure was declared at the UE 115 and may identify the selected beam 318. Accordingly, the base station 105 may use the beam 318 for a number of directional transmissions to the UE 115.

The UE 115 may monitor for a downlink message from the base station 105 responsive to the random access message a time interval (e.g., four slots) after transmitting the random access message. In some cases, the UE 115 may monitor a pre-configured resource set for the downlink message. At 338, for example, the UE 115 may monitor a pre-configured CORESET with recoverySearchSpaceId within an RAR window 340 for the downlink message. As such, the downlink message may be an RAR carried by a physical downlink shared channel (PDSCH) or a control message associated with an RAR carried by a physical downlink control channel (PDCCH). In some cases, the base station 105 may configure a CORSET for each BWP supported at the UE 115 and the UE 115 may determine to monitor the CORESET associated with the active BWP of the UE 115 (e.g., the active BWP of the UE 115 at the time of beam failure). For instance, the UE 115 may determine to monitor a CORESET associated with the reference signal resources 313 and the $q_1$ set 310 of candidate beams 315. Accordingly, the UE 115 may monitor the CORESET to receive the downlink message responsive to the random access message sent with the dedicated preamble (e.g., the preamble associated with beam 318).

At 343, the UE 115, at the L1 348, may receive the downlink message from the base station 105 on the beam 318 in the configured CORESET and the L1 348 may provide an indication to the higher layers 345 that the downlink message was received. In some cases, the base station 105 may transmit the downlink message to the UE 115 to acknowledge successful reception of the random access message transmitted at 335. Accordingly, the UE 115 may determine, upon receiving the downlink message, that the base station 105 successfully received the random access message and determine that the beam 318 may be used for directional transmissions between the UE 115 and the base station 105. As such, the UE 115 may terminate the BFR timer 330. Alternatively, if the BFR timer 330 expires prior to receiving the downlink message from the base station, the UE 115 may declare a radio link failure.

In some cases, the UE 115 may communicate with the base station 105 using a number of different BWPs and each BWP may be associated with different BFR parameters. The UE 115 may potentially declare beam failure on any active BWP, therefore the base station 105 may configure each operable BWP with BFR parameters to enable the UE 115 to perform a BFR procedure regardless of which BWP is active at the time beam failure is declared. For instance, the base station 105 may configure each BWP with a different $q_1$ set 310 of candidate beams 315, different RACH resources for the UE 115 to use to transmit a random access message, and different resources for the UE 115 to monitor for a downlink message from the base station 105 (e.g., different CORESETs). In cases where the UE 115 supports a large number of BWPs, such as NBWPs, the memory cost and signaling overhead associated with configuring each BWP with a different set of BFR parameters may hinder the performance and capability of the UE 115 and the base station 105.

Although described in the context of BWPs, the described techniques may be equally applicable to SBs, sets of resource blocks, or other groupings or sets of frequency resources instead of or in addition to BWPs. For example, the UE 115 may operate or support a number of SBs while communicating with the base station 105 and may be configured with a different $q_1$ set 310 of candidate beams 315 and different reference signal resources 313 for each SB. Similarly, the UE 115 may be configured with different resources (e.g., different PRACH resources) and different CORESETs (e.g., different PDCCH resources) for each SB supported by the UE 115. As such, in cases where the UE 115 operates or supports a number of SBs, the number of configured $q_1$ sets 310, the amount of configured reference signal resources 313, the amount of configured PRACH resources, and the amount of configured CORESETs that the UE 115 may be configured with for BFR procedures may similarly occupy a significant portion of the memory of the UE 115 and potentially result in high levels of signaling overhead.

In some implementations of the present disclosure, the base station 105 may configure a single BWP or a single SB with BFR parameters and the UE 115 may determine to use the BWP or SB configured with BFR parameters to perform BFR procedures regardless of which BWP or SB is the active when a beam failure is declared. In some aspects, the BWP or SB that is configured with BFR parameters may be referred to as an anchor BWP or an anchor SB, respectively, of the UE 115. As such, upon declaration of a beam failure (e.g., when the BFI counter is equal to or greater than a maximum or upper limit count of BFIs), the UE 115 may switch to the anchor BWP or the anchor SB to perform the BFR procedure, as described in more detail with reference to FIG. 4. In some examples, the anchor BWP or SB may be one of the BWPs or SBs between which the UE 115 hops/switches. In this manner, the UE 115 may reduce the memory costs associated with BFR procedures while maintaining the frequency diversity achieved as a result of BWP hopping or SB hopping. Moreover, the base station 105 may configure fewer BWPs or SBs with BFR parameters, which may reduce overhead signaling and improve system performance.

Figure 4:
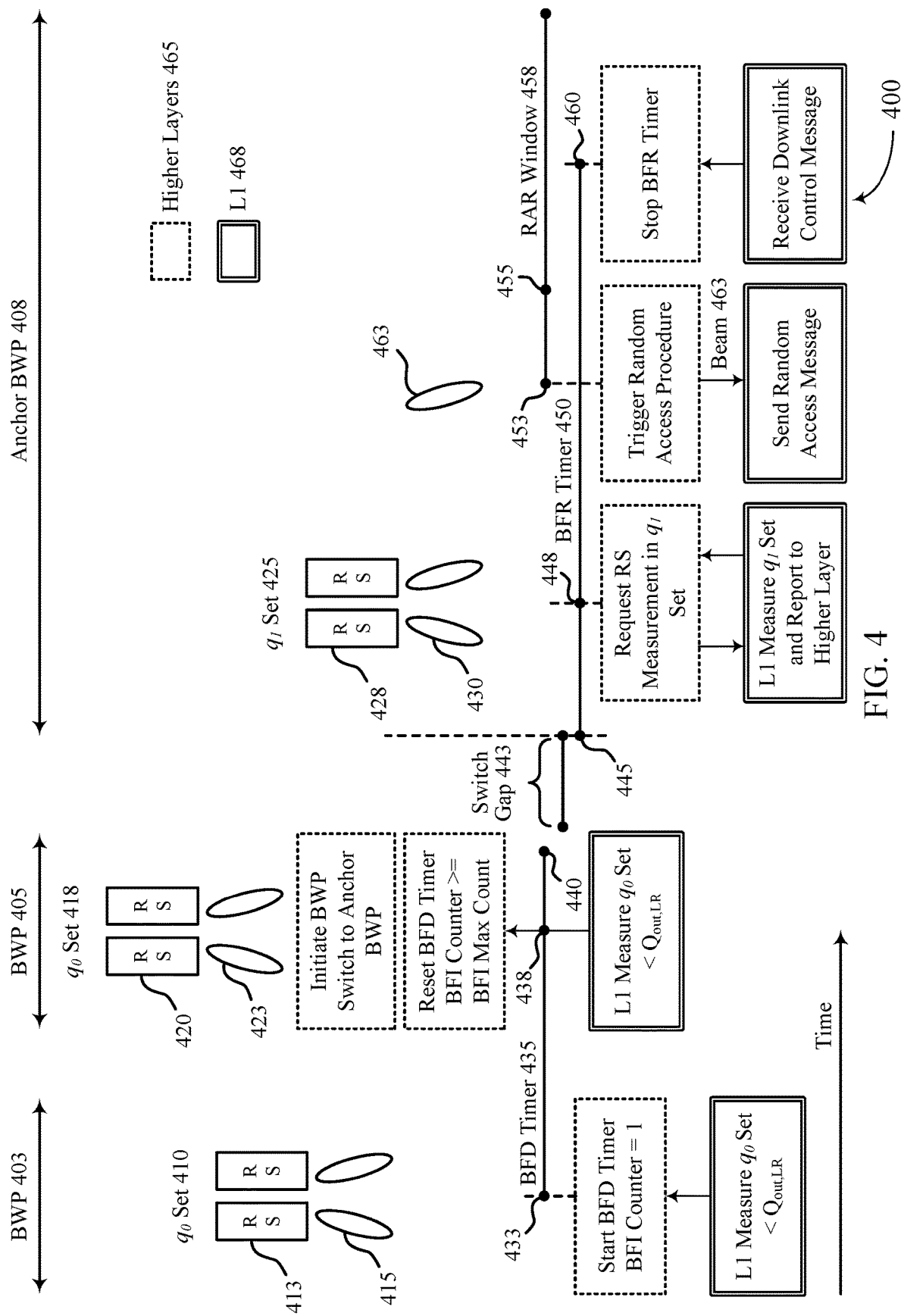
FIG. 4 illustrates an example of a communication timeline that supports BFR procedure resource reduction with BWP hopping in accordance with aspects of the present disclosure.

FIG. 4 illustrates an example of a communication timeline 400 that supports BFR procedure resource reduction with BWP hopping in accordance with aspects of the present disclosure. In some examples, the communication timeline 400 may implement aspects of the wireless communications system 100 or the wireless communications system 200. The communication timeline 400 may illustrate BFD and BFR procedures at a UE 115, which may be an example of corresponding devices described herein, including with reference to FIGS. 1 and 2. In some examples, the UE 115 may support a number of operating BWPs and may switch between the BWPs while communicating with a base station 105, which may be an example of corresponding devices as described herein. The UE 115 may measure a set of reference signals associated with the active BWP of the UE 115 and, in some cases, may declare beam failure and determine to perform a BFR procedure. In some implementations, the UE 115 may identify an anchor BWP 408 that is configured with BFR parameters and may switch to the anchor BWP 408 to perform the BFR procedure. In some examples, the anchor BWP 408 may be one of the BWPs between which the UE 115 hops/switches.

Although FIG. 4 is described in the context of BWPs, the described techniques may be equally applicable to SBs (e.g., or sets of resource blocks, or other groupings or sets of frequency resources instead of or in addition to BWPs or SBs), as described with reference to FIG. 3. For example, the UE 115 may support a number of SBs and may switch or hop between different SBs while communicating with the base station 105. The UE 115 may similarly switch to an anchor SB to perform a BFR procedure, where the anchor SB may be configured with a set of BFR parameters that the UE 115 may use to perform the BFR procedure on the anchor SB.

In some cases, the UE 115 (e.g., a reduced capability device) may support BWP hopping (e.g., NBWP hopping) to achieve a greater frequency diversity for wireless communications between the UE 115 and the base station 105. Further, the UE 115 may support beamforming communication techniques and may communicate with the base station 105 using beamformed transmissions. As described herein, the quality of the directional beam that the UE 115 and the base station 105 use for directional transmissions may change over time and the UE 115 may measure a number of reference signals to determine whether a current beam satisfies a threshold signal strength at the UE 115. In some cases, each BWP supported or operated by the UE 115 may be configured with a set of reference signal resources that the UE 115 may monitor for reference signals. Accordingly, the UE 115 may measure different sets of reference signals for each BWP that the UE 115 operates. Nonetheless, a BFD procedure, as described in more detail with reference to FIG. 3, may be transparent to the different BWPs. For example, the UE 115 may maintain a single BFD procedure across a number of different BWPs (e.g., across different sets of reference signals).

At 433, for example, the UE 115 may communicate with the base station 105 using BWP 403. The UE 115 may be configured with a $q_0$ set 410 of reference signal resources 413 associated with the BWP 403 and the UE 115 may periodically receive a number of reference signals by monitoring the configured reference signal resources 413. In some cases, the base station 105 may transmit each of the number of reference signals with a different beam 415 that the UE 115 and the base station 105 may use to communicate. The UE 115 may periodically receive the reference signals via L1 468 of the UE 115 and the UE 115 may measure the received signal strength of each reference signal and compare the measured signal strengths to a first threshold (e.g., a first threshold signal strength or signal quality), which may be referred to as $Q_{out,LR}$. If a threshold number of reference signals (e.g., all of the reference signals associated with the reference signal resources 413) fail to satisfy the first threshold (e.g., are received with a lower signal strength than the first threshold), the L1 468 of the UE 115 may send an indication of a BFI to higher layers 465 of the UE 115 (e.g., L2, the MAC layer, the RLC layer, or the RRC layer, among other examples). The higher layers 465 may maintain a BFI counter and, based on receiving the indication of the BFI, may set the BFI counter to 1 and start a BFD timer 435, as described in more detail with reference to FIG. 3.

At 438, the UE 115 may switch or hop to a BWP 405. The UE 115 may be configured with a $q_0$ set 418 of reference signal resources 420 associated with the BWP 405. In some cases, the reference signal resources 420 may be different than the reference signal resources 413 as a result of the resource differences between the BWP 403 and the BWP 405. The UE 115 may receive a number of reference signals by monitoring the reference signal resources 420. In some cases, the base station 105 may transmit each of the number of reference signals with a different beam 423 that the UE 115 and the base station 105 may use to communicate (e.g., each reference signal transmitted in the $q_0$ set 418 of reference signal resources 420 may be associated with a unique beam). In some cases, the number of reference signals may be CSI-RSs or SSBs.

The UE 115, at the L1 468, may periodically receive the reference signals and may measure a received signal strength of each reference signals. The UE 115 may compare the measured signal strength to the first threshold (e.g., $Q_{out,LR}$) to determine if a reference signal of the number of received reference signals satisfies the first threshold. In some cases, the UE 115 may determine that a threshold number of the reference signals (e.g., all of the number of reference signals received in the configured $q_0$ set 418 of reference signal resources 420) fail to satisfy the first threshold and the L1 468 may transmit an indication of a BFI to the higher layers 465 of the UE 115. The higher layers 465 may receive the BFI indication and, accordingly, increment the BFI counter and reset the BFD timer 435. In some cases, the higher layers 465 may increment the BFI counter and determine that the BFI counter is greater than or equal to a maximum count of BFIs. As such, the higher layers 465 of the UE 115 may determine that a threshold number of BFIs have been measured by the L1 468 of the UE 115 prior to the expiration of the BFD timer at 440 and determine that the beam between the UE 115 and the base station 105 has failed, as described in more detail with reference to FIG. 3. Accordingly, the UE 115 may declare beam failure and may perform a BFR procedure to re-establish communication with the base station 105 using a different beam.

In some implementations of the present disclosure, the higher layers 465, upon declaration of beam failure by the UE 115, may initiate a switch to the anchor BWP 408 to perform the BFR procedure. In some examples, the UE 115 (e.g., the higher layers 465 of the UE 115) may determine to initiate the switch to the anchor BWP 408 based on an indication from the base station 105. For example, the base station 105 may transmit signaling to the UE 115 to inform the UE 115 of a mode in which the UE 115 may operate for BFR procedures. In some aspects, for instance, the base station 105 may transmit an indication to the UE 115 to operate according to a first mode where the UE 115 may perform a BFR procedure on the active BWP at the time beam failure is declared (e.g., to perform a BFR procedure using BWP 405). In some other aspects, the base station 105 may transmit an indication to the UE 115 to operate according to a second mode where the UE 115 may perform a BFR procedure on the anchor BWP 408.

Additionally or alternatively, the UE 115 may determine whether to operate in the first mode or the second mode independently of explicit signaling from the base station 105. For example, the UE 115 may determine whether to operate in the first mode or the second mode based on an implicit indication from the base station 105, which may be based on a rule configured at the UE 115. In some aspects, the UE 115 may receive an indication of the rule from the base station 105. In some other aspects, the UE 115 may be pre-configured with the rule.

In some examples, the UE 115 may implement the rule to determine whether to operate in the first mode and perform a BFR procedure on the BWP 405 or to operate in the second mode and perform a BFR procedure on the anchor BWP 408 based on which BWPs the base station 105 configures with BFR parameters. For example, the base station 105 may configure all of the BWPs supported by the UE 115 with BFR parameters. As such, the UE 115 may determine that the UE 115 may remain on BWP 405 (e.g., the active BWP at the time of beam failure declaration) to perform the BFR procedure. Alternatively, the base station may configure the anchor BWP 408 with BFR parameters and may refrain from configuring the remainder of the BWPs supported by the UE 115 with BFR parameters. The UE 115 may determine that the anchor BWP 408 is configured with BFR parameters and that the other BWPs supported by the UE 115 are absent of BFR parameters and, accordingly, may determine to switch to the anchor BWP 408 to perform the BFR procedure.

As illustrated in FIG. 4, the UE 115 may determine to switch to the anchor BWP 408 to perform a BFR procedure upon declaration of beam failure at 438. As such, anchor BWP 408 may be configured with BFR parameters while the BWP 403 and the BWP 405 may be absent of configured BFR parameters. In some examples, the UE 115 may implement a time delay prior to performing the BFR procedure, such as a switch gap 443. The switch gap 443 may allow the UE 115 sufficient time to switch from the BWP 405 to the anchor BWP 408. In other words, the switch gap 443 may allow the UE 115 to switch to and settle on the anchor BWP 408 before initiating the BFR procedure. The switch gap 443 may be implemented in a variety of ways without exceeding the scope of the present disclosure. In some aspects, the switch gap 443 may be governed by a timer at the higher layers 465 of the UE 115. The switch gap 443 may begin when the higher layers 465 determine that the BFI counter is greater than or equal to the maximum count (e.g., the switch gap may start upon declaration of beam failure) at 438. Alternatively, the switch gap 443 may begin at the scheduled expiration of the BFD timer 435 at 440 or may begin at any time after expiration of the BFD timer 435.

At 445, the switch gap 443 may expire and the anchor BWP 408 may be the active BWP of the UE 115. As such, the higher layers 465 of the UE 115 may initiate the BFR procedure and begin a BFR timer 450, as described in more detail with reference to FIG. 3. The anchor BWP 408 may be configured with a $q_1$ set 425 of candidate beams 430. The higher layers 465 may request the L1 468 of the UE 115 to measure a reference signal (e.g., a CSI-RS or an SSB) associated with each candidate beam 430. The UE 115, at the L1 468, may receive a set of reference signals corresponding to the $q_1$ set 425 of candidate beams 430 by monitoring a set of reference signal resources 428 that are also configured for the anchor BWP 408. The L1 468 of the UE 115 may measure the received signal strength of the set of reference signals and report the measured signal strength of each reference signal (e.g., of each candidate beam 430) to the higher layers 465. The higher layers 465 may compare the measured signal strength associated with each candidate beam 430 to a second threshold (e.g., a threshold signal strength), which may be referred to as $Q_{in,LR}$.

At 453, the higher layers 465 may select a candidate beam 430 based on the received signal strengths of each of the candidate beams 430. For example, the higher layers 465 may determine that a beam 463 of the $q_1$ set 425 of candidate beams 430 was measured to have the highest received signal strength by the L1 468 and may select beam 463 as the beam for the UE 115 to use to re-establish communication with the base station 105. The higher layers 465 may trigger a random access procedure (e.g., a RACH procedure) and may request the L1 468 of the UE 115 to transmit a random access message to the base station 105 associated with the selected beam 463. In some cases, the higher layers 465 may provide an indication of the selected beam 463 to the L1 468 along with the request to transmit the random access message and the selected beam 463 may be referred to as $q_{new}$.

The UE 115 may, at the L1 468, transmit the random access message in a RACH, such as a PRACH, and, likewise, the random access message may be referred to as a RACH message. In some cases, the random access message transmitted by the UE 115 may use the beam 463 and may be associated with a random access message of a CFRA procedure, as described in more detail with reference to FIG. 3. The resources of the PRACH that the UE 115 uses to transmit the random access message may be dedicated for BFR procedures and may be unique to the anchor BWP 408. For instance, the UE 115 may be configured with PRACH-ResourceDedicatedBFR that the UE 115 may use for random access messages associated with BFR procedures on the anchor BWP 408. In some cases, the beam 463 may be associated with a dedicated preamble and the random access message may include the dedicated preamble, which the base station 105 may use to determine the beam 463 to use for directional transmissions to the UE 115, as described in more detail with reference to FIG. 3.

At 455, the UE 115 may begin monitoring a CORESET with recoverySearchSpaceId configured for the anchor BWP 408 for a downlink message from the base station 105. The downlink message may be responsive to the random access message transmitted by the UE 115 at 453 and the UE 115 may expect to receive the downlink message during an RAR window 458, as described in more detail with reference to FIG. 3. As such, the downlink message may be an RAR carried by PDSCH or a control message associated with an RAR carried by PDCCH. In some cases, the UE 115 may monitor the RAR window 458 a number of slots (e.g., four slots) after transmitting the random access message. In some specific examples, the base station 105 may configure the UE 115 with a single CORESET for BFR procedures on the anchor BWP 408, which may result in fewer CORESETs for BFR procedures configured at the UE 115.

At 460, the UE 115, at the L1 468, may receive the downlink message on the beam 463 by monitoring the configured CORESET and, based on receiving the downlink message, may determine that the base station 105 successfully received the random access message transmitted from the UE 115 at 453. Accordingly, the L1 468 of the UE 115 may provide an indication to the higher layers 465 that the downlink message was received from the base station 105 and the higher layers 465 may stop the BFR timer 450.

In such cases, the UE 115 and the base station 105 may successfully complete the BFR procedure and re-establish communication with the beam 463. By switching to the anchor BWP 408 to perform the BFR procedure, the UE 115 may avoid unnecessarily storing BFR parameters for a number of BWPs (e.g., the UE 115 may store BFR parameters for a single BWP instead). For example, by implementing the described techniques, the UE 115 may be configured with fewer PRACH occasions, a fewer number of CORESETs, and fewer reference signal resources 428 within $q_1$ sets 425. As such, the UE 115 may allocate less memory space for BFR procedures and, likewise, increase the storage capacity of the UE 115. Moreover, the base station 105 may configure the UE 115 with fewer resources for BFR procedures, which may result in less signaling overhead and greater system efficiency as a result of more efficiently allocating resources within the system.

Figure 5:
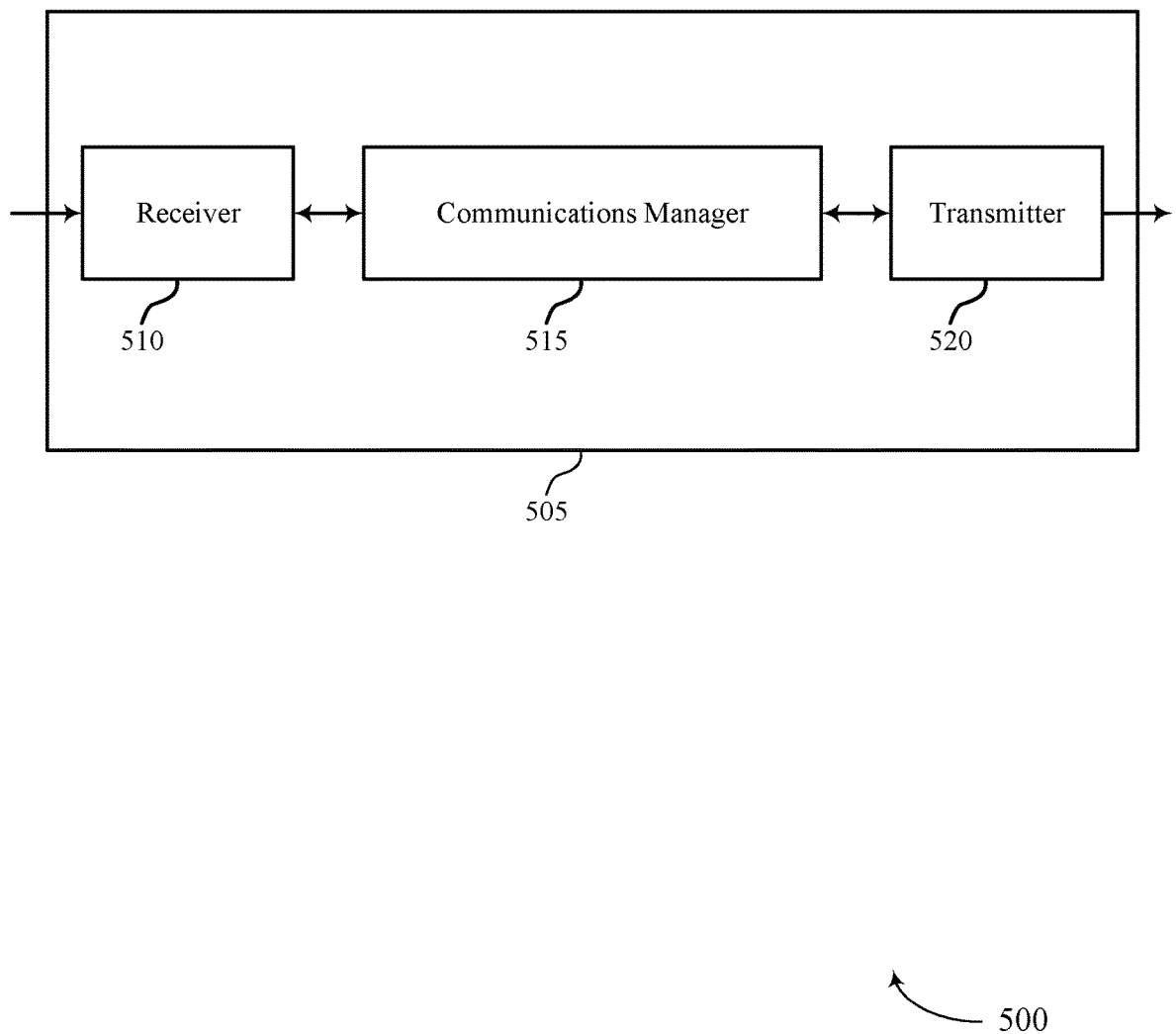
FIGS. 5 and 6 show block diagrams of devices that support BFR procedure resource reduction with BWP hopping in accordance with aspects of the present disclosure.

FIG. 5 shows a block diagram 500 of a device 505 that supports BFR procedure resource reduction with BWP hopping in accordance with aspects of the present disclosure. The device 505 may be an example of aspects of a UE 115 as described herein. The device 505 may include a receiver 510, a communications manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to BFR procedure resource reduction with BWP hopping, etc.). Information may be passed on to other components of the device 505. The receiver 510 may be an example of aspects of the transceiver 820 described with reference to FIG. 8. The receiver 510 may utilize a single antenna or a set of antennas.

The communications manager 515 may switch between a set of BWPs configured for the UE to communicate with a base station, the set of BWPs including at least a first BWP and a second BWP, determine a beam failure while communicating with the base station using the first BWP according to the switching, transition, based on the determined beam failure, from the first BWP to the second BWP, and perform, using the second BWP, a BFR procedure based on the determined beam failure. The communications manager 515 may be an example of aspects of the communications manager 810 described herein.

The communications manager 515, or its sub-components, may be implemented in hardware, code (e.g., software or firmware) executed by a processor, or any combination thereof. If implemented in code executed by a processor, the functions of the communications manager 515, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

In some examples, the communications manager 515 may be implemented as an integrated circuit or chipset for a mobile device modem, and the receiver 510 and the transmitter 520 may be implemented as analog components (e.g., amplifiers, filters, antennas) coupled with the mobile device modem to enable wireless transmission and reception over one or more bands.

The communications manager 515 as described herein may be implemented to realize one or more potential advantages. One implementation may enable the device 505 to determine whether to remain on an active BWP or switch to an anchor BWP to perform a BFR procedure. In some examples of the described techniques, a base station may refrain from configuring the device 505 with BFR parameters for each BWP supported by the device 505. Instead, the base station may configure the device 505 with BFR parameters for an anchor BWP of the device 505, which may reduce the amount of BFR parameters configured at the device 505.

Based on reducing the amount of BFR parameters configured at the device 505, the device 505 may allocate less memory to BFR resource configurations, which may increase the memory capacity of the device 505. Further, the device 505 may potentially receive less signaling from the base station 105 associated with configuring BFR parameters, which may reduce power consumption and complexity at the device 505.

Figure 6:
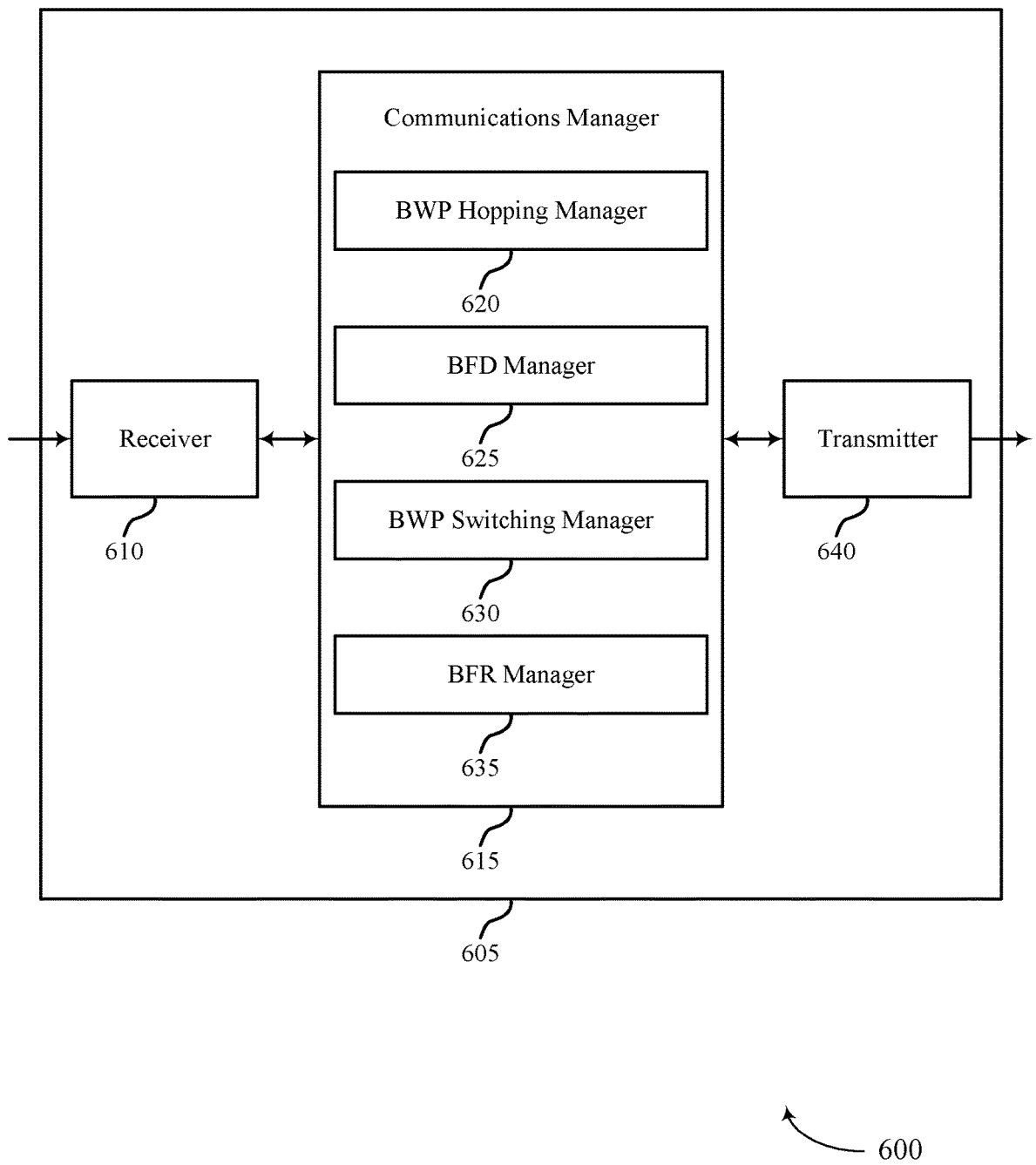

FIG. 6 shows a block diagram 600 of a device 605 that supports BFR procedure resource reduction with BWP hopping in accordance with aspects of the present disclosure. The device 605 may be an example of aspects of a device 505, or a UE 115 as described herein. The device 605 may include a receiver 610, a communications manager 615, and a transmitter 640. The device 605 may also include a processor. Each of these components may be in communication with one another (e.g., via one or more buses).

The receiver 610 may receive information such as packets, user data, or control information associated with various information channels (e.g., control channels, data channels, and information related to BFR procedure resource reduction with BWP hopping, etc.). Information may be passed on to other components of the device 605. The receiver 610 may be an example of aspects of the transceiver 820 described with reference to FIG. 8. The receiver 610 may utilize a single antenna or a set of antennas.

The communications manager 615 may be an example of aspects of the communications manager 515 as described herein. The communications manager 615 may include a BWP hopping manager 620, a BFD manager 625, a BWP switching manager 630, and a BFR manager 635. The communications manager 615 may be an example of aspects of the communications manager 810 described herein.

The BWP hopping manager 620 may switch between a set of BWPs configured for the UE to communicate with a base station, the set of BWPs including at least a first BWP and a second BWP. The BFD manager 625 may determine a beam failure while communicating with the base station using the first BWP according to the switching. The BWP switching manager 630 may transition, based on the determined beam failure, from the first BWP to the second BWP. The BFR manager 635 may perform, using the second BWP, a BFR procedure based on the determined beam failure.

The transmitter 640 may transmit signals generated by other components of the device 605. In some examples, the transmitter 640 may be collocated with a receiver 610 in a transceiver module. For example, the transmitter 640 may be an example of aspects of the transceiver 820 described with reference to FIG. 8. The transmitter 640 may utilize a single antenna or a set of antennas.

Figure 7:
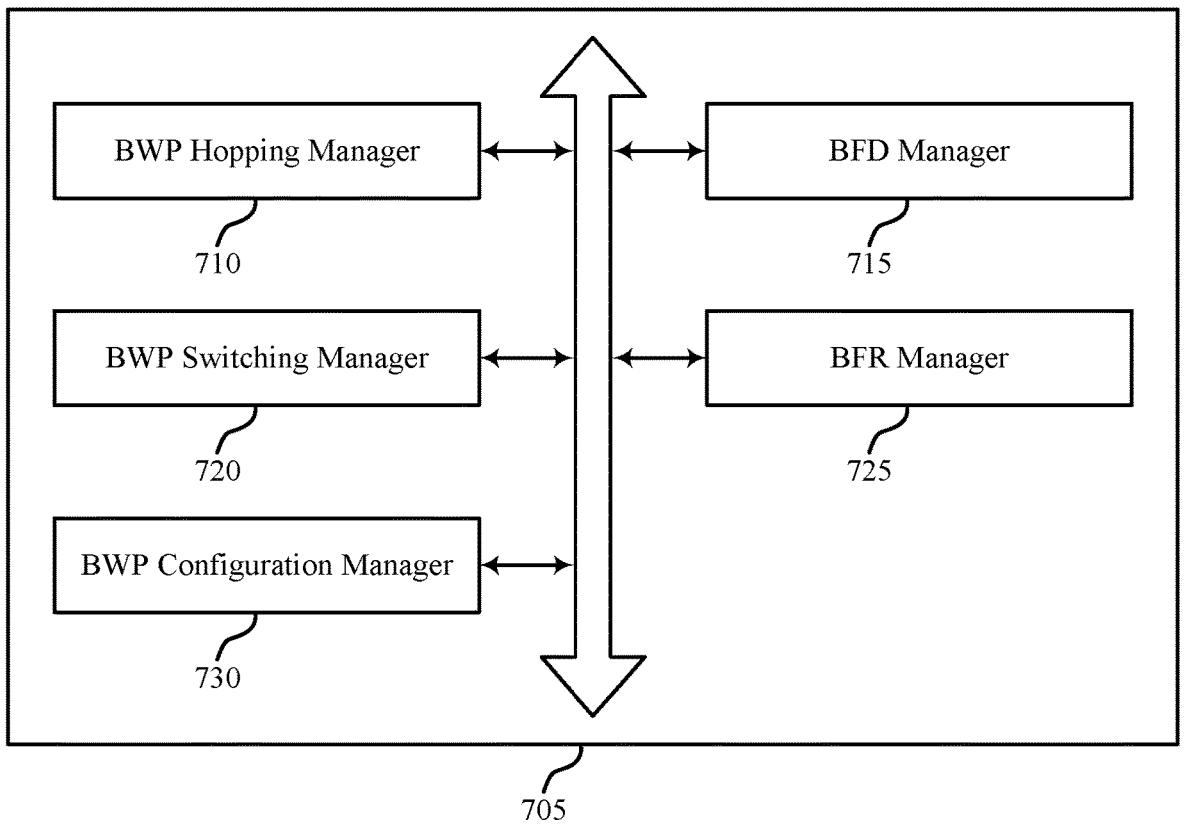
FIG. 7 shows a block diagram of a communications manager that supports BFR procedure resource reduction with BWP hopping in accordance with aspects of the present disclosure.

FIG. 7 shows a block diagram 700 of a communications manager 705 that supports BFR procedure resource reduction with BWP hopping in accordance with aspects of the present disclosure. The communications manager 705 may be an example of aspects of a communications manager 515, a communications manager 615, or a communications manager 810 described herein. The communications manager 705 may include a BWP hopping manager 710, a BFD manager 715, a BWP switching manager 720, a BFR manager 725, and a BWP configuration manager 730. Each of these modules may communicate, directly or indirectly, with one another (e.g., via one or more buses).

The BWP hopping manager 710 may switch between a set of BWPs configured for the UE to communicate with a base station, the set of BWPs including at least a first BWP and a second BWP. In some examples, the BWP hopping manager 710 may identify a hopping pattern for the set of BWPs configured for the UE, where the hopping pattern indicates a set of a time periods during which a different BWP of the set of BWPs is used by the UE to communicate with the base station, and where the switching between the set of BWPs is according to the identified hopping pattern.

The BFD manager 715 may determine a beam failure while communicating with the base station using the first BWP according to the switching. In some examples, the BFD manager 715 may count, while communicating the base station using the set of BWPs according to the switching, a number of instances of beam failure for beams associated with the set of BWPs.

In some examples, the BFD manager 715 may identify that the counted number of instances of the beam failure satisfies a threshold value. In some examples, the BFD manager 715 may determine the beam failure associated with the set of BWPs based on the counted number of instances of the beam failure satisfying the threshold value.

The BWP switching manager 720 may transition, based on the determined beam failure, from the first BWP to the second BWP. In some examples, the BWP switching manager 720 may determine, based on identifying that the received configuration indicates beam failure parameters for the second BWP, that the UE is to transition to the second BWP to perform the BFR procedure.

In some examples, the BWP switching manager 720 may identify that the received configuration fails to indicate beam failure parameters for the first BWP, where determining that the UE is to transition to the second BWP to perform the BFR procedure is further based on identifying that the received configuration fails to indicate beam failure parameters for the first BWP. In some cases, the transitioning from the first BWP to the second BWP is performed after expiry of a timer associated with beam failure detection, the timer associated with the BFR procedure started after the expiry of the timer associated with the beam failure detection and a beam switching gap duration.

The BFR manager 725 may perform, using the second BWP, a BFR procedure based on the determined beam failure. In some examples, the BFR manager 725 may start a timer associated with the BFR procedure based on the transitioning from the first BWP to the second BWP. In some examples, the BFR manager 725 may measure a signal quality of one or more reference signals of a set of one or more beams for beam recovery.

In some examples, the BFR manager 725 may select, based on the measured signal quality of the one or more reference signals, a beam of the set of one or more beams. In some examples, the BFR manager 725 may transmit, on the selected beam, a preamble the BFR procedure. In some examples, the BFR manager 725 may receive, in response to the transmitted signal, a response of the BFR procedure.

The BWP configuration manager 730 may receive a configuration indicating that the UE is to transition to the second BWP to perform the BFR procedure. In some examples, the BWP configuration manager 730 may receive a configuration for the set of BWPs for the UE. In some cases, the configuration includes an indicator of a first mode of a set of modes, where the first mode indicates that the UE is to transition to the second BWP to perform the BFR procedure, and where a second mode of the set of modes indicates that the UE is to perform the BFR procedure on the first BWP based on the first BWP being an active BWP for the UE when the beam failure was determined.

In some cases, the configuration includes a first configuration for the first BWP and a second configuration for the second BWP, the second configuration including an indication of one or more of a set of beams for beam recovery, a set of resources for a random access procedure, or a recovery search space of a CORESET. In some cases, the first configuration lacks the indication the set of beams for beam recovery, the set of resources for the random access procedure, and the recovery search space of the CORESET.

Figure 8:
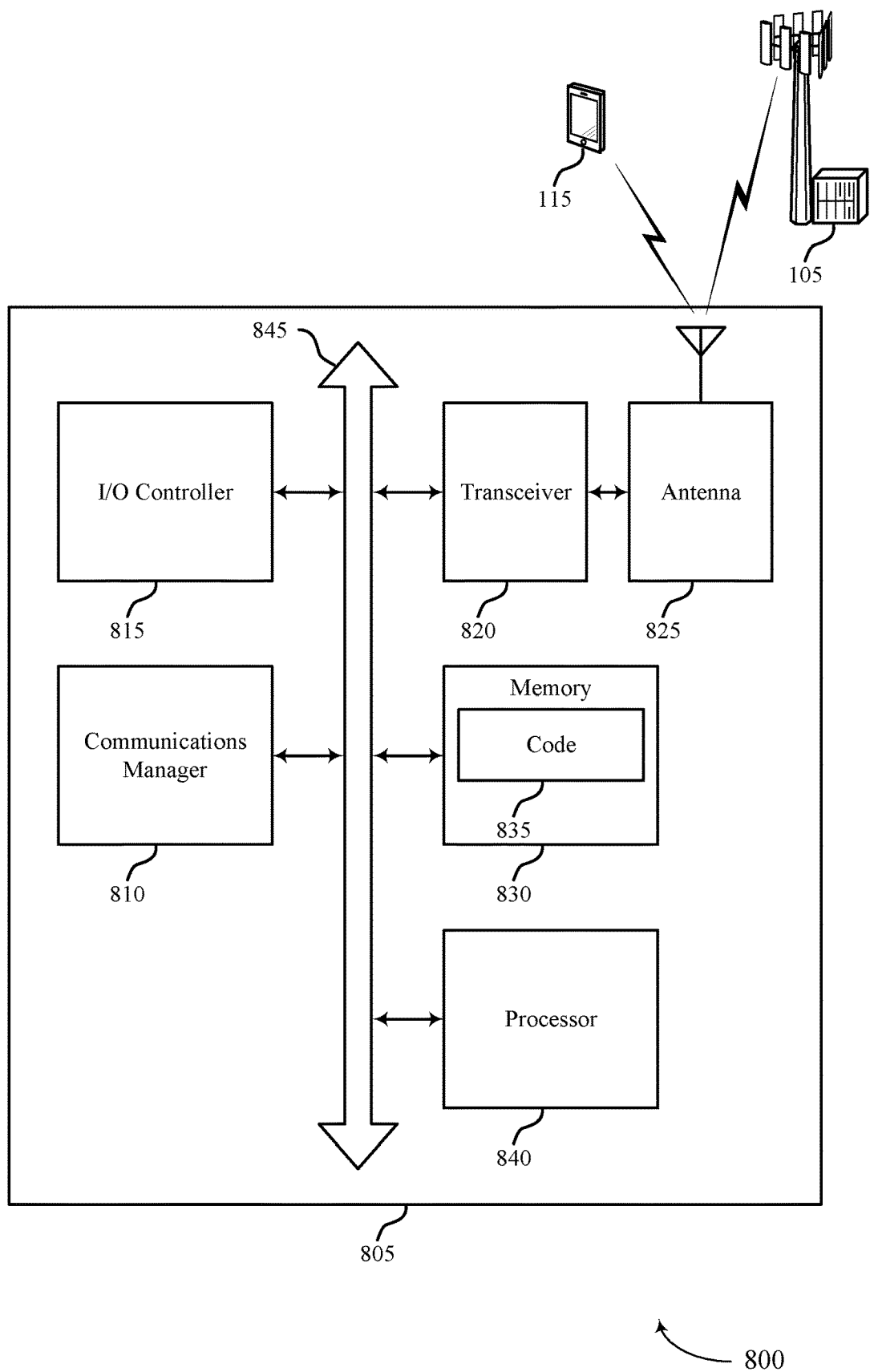
FIG. 8 shows a diagram of a system including a device that supports BFR procedure resource reduction with BWP hopping in accordance with aspects of the present disclosure.

FIG. 8 shows a diagram of a system 800 including a device 805 that supports BFR procedure resource reduction with BWP hopping in accordance with aspects of the present disclosure. The device 805 may be an example of or include the components of device 505, device 605, or a UE 115 as described herein. The device 805 may include components for bi-directional voice and data communications including components for transmitting and receiving communications, including a communications manager 810, an I/O controller 815, a transceiver 820, an antenna 825, memory 830, and a processor 840. These components may be in electronic communication via one or more buses (e.g., bus 845).

The communications manager 810 may switch between a set of BWPs configured for the UE to communicate with a base station, the set of BWPs including at least a first BWP and a second BWP, determine a beam failure while communicating with the base station using the first BWP according to the switching, transition, based on the determined beam failure, from the first BWP to the second BWP, and perform, using the second BWP, a BFR procedure based on the determined beam failure.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described herein. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include random-access memory (RAM) and read-only memory (ROM). The memory 830 may store computer-readable, computer-executable code 835 including instructions that, when executed, cause the processor to perform various functions described herein. In some cases, the memory 830 may contain, among other things, a basic I/O system (BIOS) which may control basic hardware or software operation such as the interaction with peripheral components or devices.

The processor 840 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting BFR procedure resource reduction with BWP hopping).

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
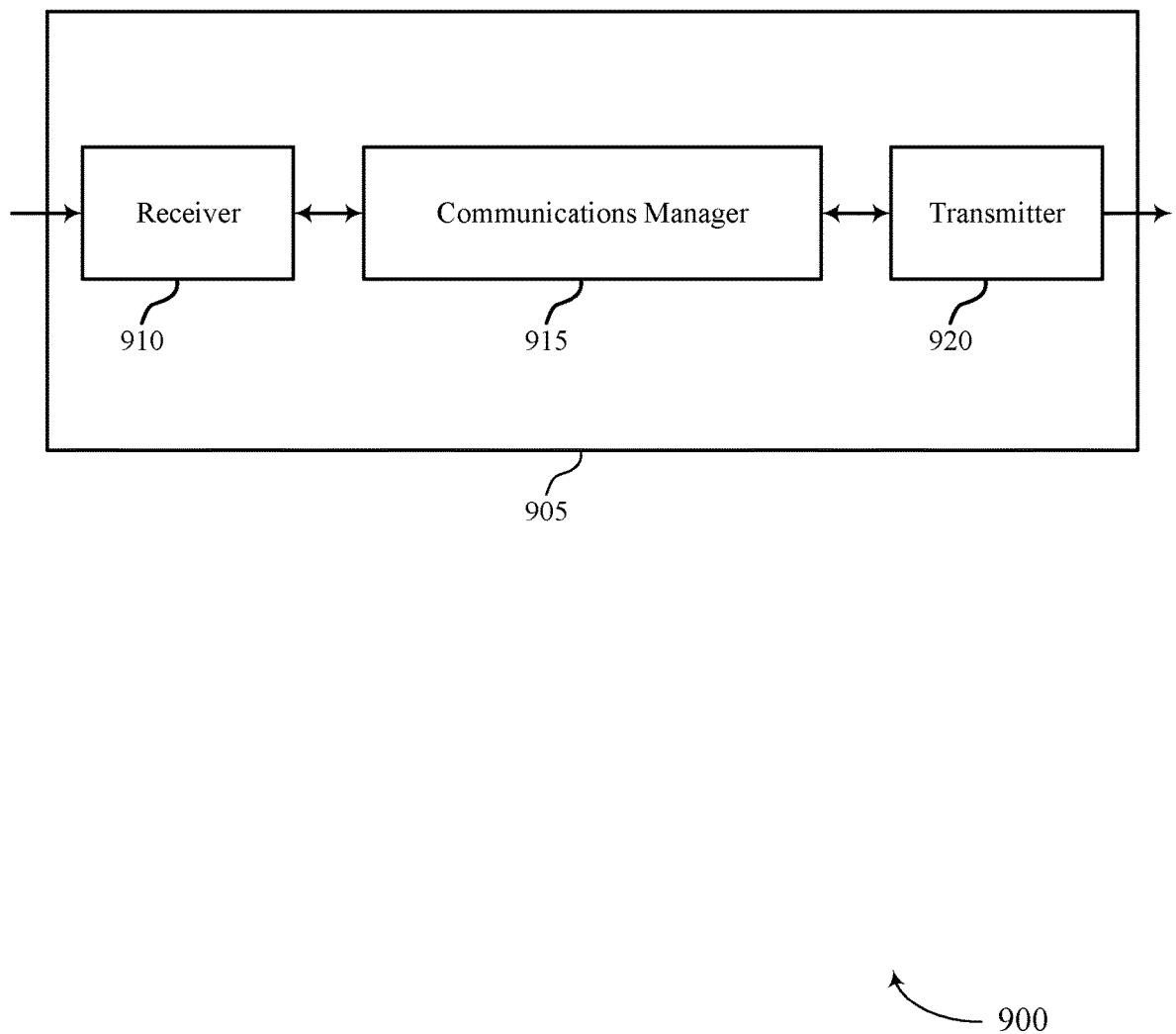
FIGS. 9 and 10 show block diagrams of devices that support BFR procedure resource reduction with BWP hopping in accordance with aspects of the present disclosure.

FIG. 9 shows a block diagram 900 of a device 905 that supports BFR procedure resource reduction with BWP hopping in accordance with aspects of the present disclosure. The device 905 may be an example of aspects of a base station 105 as described herein. The device 905 may include a receiver 910, a communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to BFR procedure resource reduction with BWP hopping, etc.). Information may be passed on to other components of the device 905. The receiver 910 may be an example of aspects of the transceiver 1220 described with reference to FIG. 12. The receiver 910 may utilize a single antenna or a set of antennas.

The communications manager 915 may transmit, to a UE, a configuration identifying a set of BWPs for the UE to use to communicate with the base station by switching between the set of BWPs, the set of BWPs including at least a first BWP and a second BWP, and the configuration indicating that the UE is to transition to the second BWP to perform a BFR procedure, receive, from the UE on an occasion associated with the second BWP, a preamble of the BFR procedure, and determine, based on receiving the preamble on the occasion associated with the second BWP, that a beam failure has occurred at the UE. The communications manager 915 may be an example of aspects of the communications manager 1210 described herein.

The communications manager 915, or its sub-components, may be implemented in hardware, code (e.g., software or firmware) executed by a processor, or any combination thereof. If implemented in code executed by a processor, the functions of the communications manager 915, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The communications manager 915, or its sub-components, may be physically located at various positions, including being distributed such that portions of functions are implemented at different physical locations by one or more physical components. In some examples, the communications manager 915, or its sub-components, may be a separate and distinct component in accordance with various aspects of the present disclosure. In some examples, the communications manager 915, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

As described herein, the device 905 may configure a UE with BFR parameters for a single BWP supported by the UE. As such, the device 905 may have a greater amount of resources available for configuring on one or more other UEs within a system, which may increase the spectral efficiency and the achievable throughput of the system. Moreover, the device 905 may perform less signaling associated with configuring BFR parameters at the UE, which may lower signaling overhead associated with transmissions from the device 905.

Figure 10:
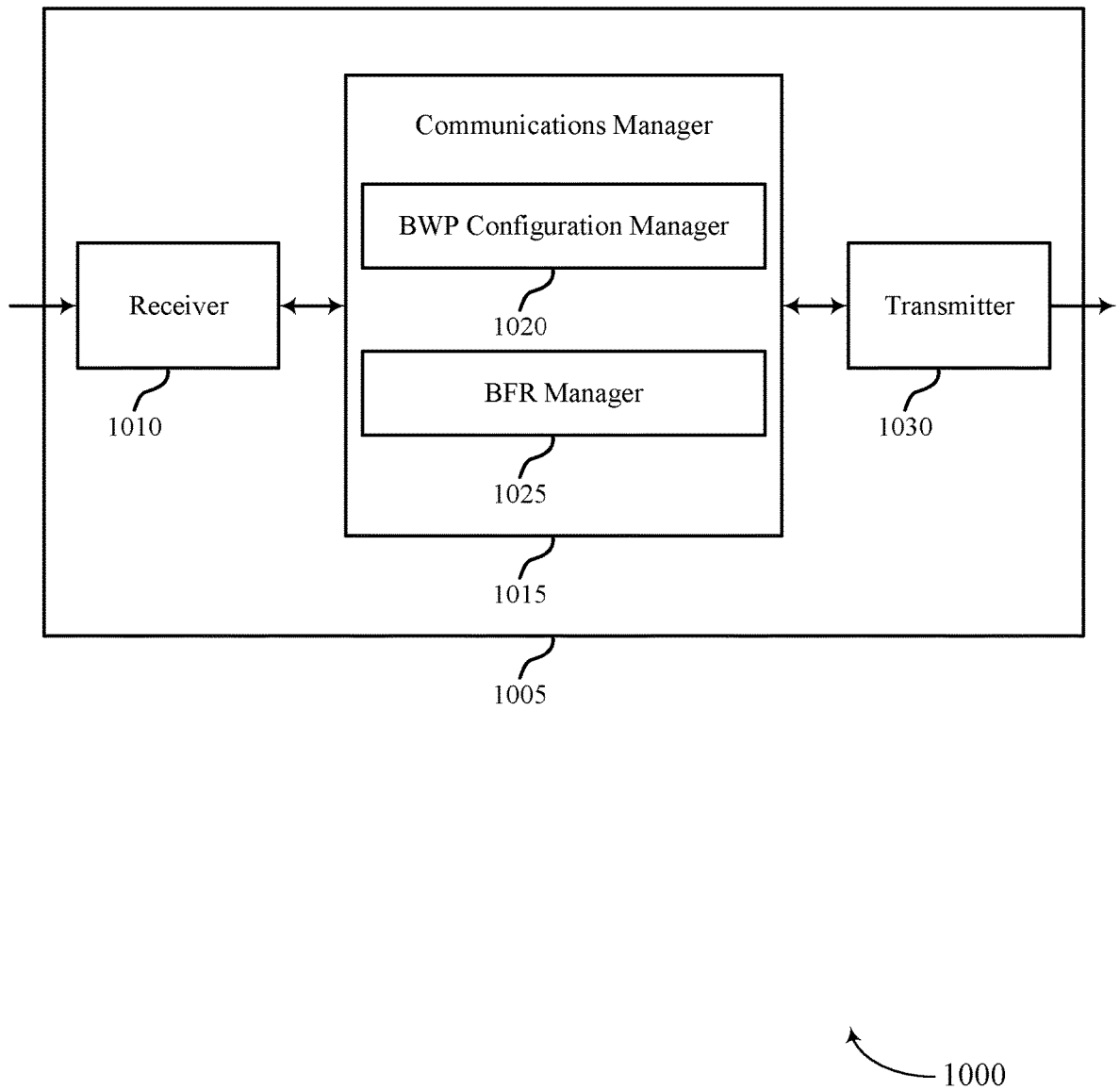

FIG. 10 shows a block diagram 1000 of a device 1005 that supports BFR procedure resource reduction with BWP hopping in accordance with aspects of the present disclosure. The device 1005 may be an example of aspects of a device 905, or a base station 105 as described herein. The device 1005 may include a receiver 1010, a communications manager 1015, and a transmitter 1030. The device 1005 may also include a processor. Each of these components may be in communication with one another (e.g., via one or more buses).

The receiver 1010 may receive information such as packets, user data, or control information associated with various information channels (e.g., control channels, data channels, and information related to BFR procedure resource reduction with BWP hopping, etc.). Information may be passed on to other components of the device 1005. The receiver 1010 may be an example of aspects of the transceiver 1220 described with reference to FIG. 12. The receiver 1010 may utilize a single antenna or a set of antennas.

The communications manager 1015 may be an example of aspects of the communications manager 915 as described herein. The communications manager 1015 may include a BWP configuration manager 1020 and a BFR manager 1025. The communications manager 1015 may be an example of aspects of the communications manager 1210 described herein.

The BWP configuration manager 1020 may transmit, to a UE, a configuration identifying a set of BWPs for the UE to use to communicate with the base station by switching between the set of BWPs, the set of BWPs including at least a first BWP and a second BWP, and the configuration indicating that the UE is to transition to the second BWP to perform a BFR procedure. The BFR manager 1025 may receive, from the UE on an occasion associated with the second BWP, a preamble of the BFR procedure and determine, based on receiving the preamble on the occasion associated with the second BWP, that a beam failure has occurred at the UE.

The transmitter 1030 may transmit signals generated by other components of the device 1005. In some examples, the transmitter 1030 may be collocated with a receiver 1010 in a transceiver module. For example, the transmitter 1030 may be an example of aspects of the transceiver 1220 described with reference to FIG. 12. The transmitter 1030 may utilize a single antenna or a set of antennas.

Figure 11:
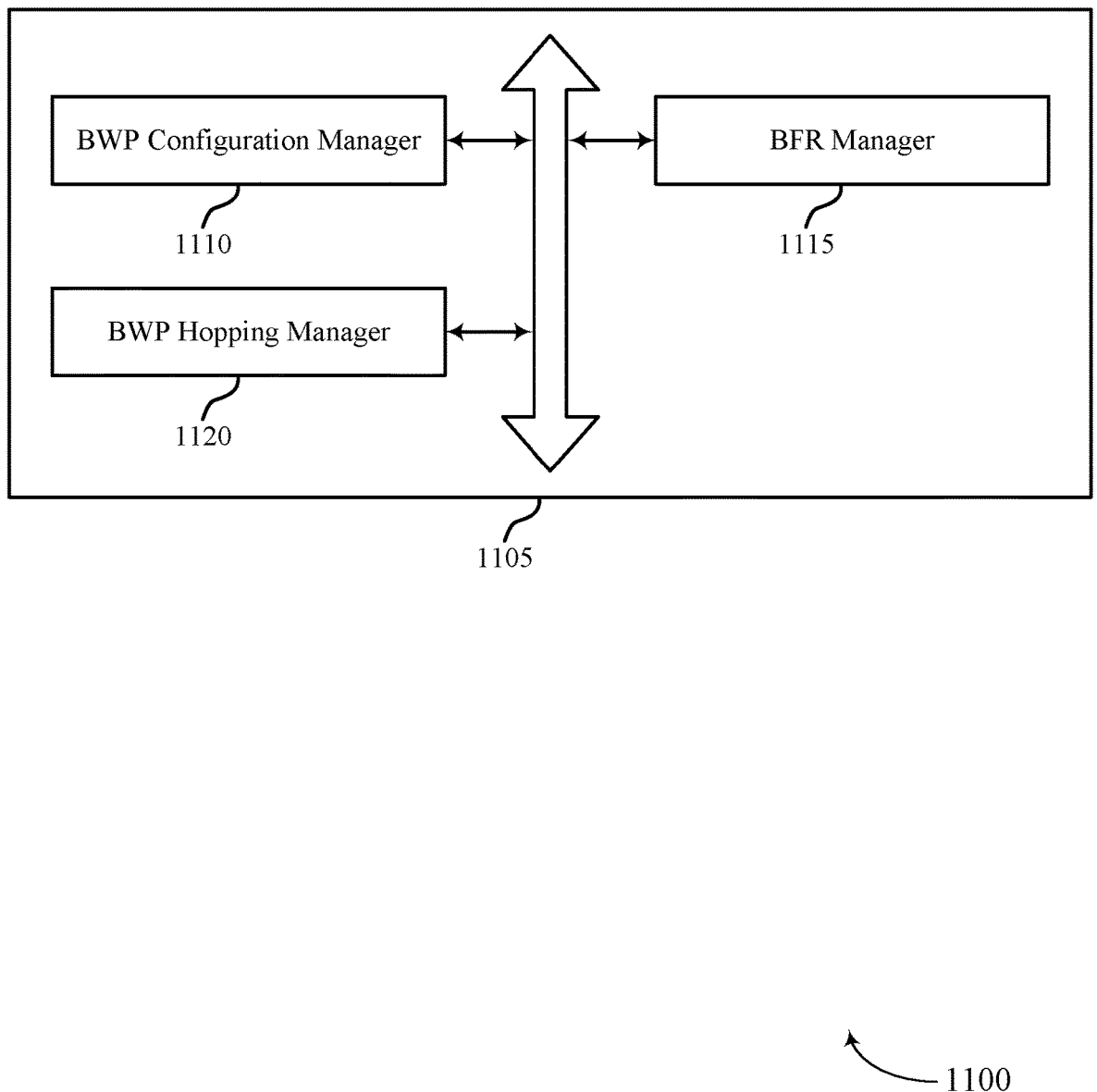
FIG. 11 shows a block diagram of a communications manager that supports BFR procedure resource reduction with BWP hopping in accordance with aspects of the present disclosure.

FIG. 11 shows a block diagram 1100 of a communications manager 1105 that supports BFR procedure resource reduction with BWP hopping in accordance with aspects of the present disclosure. The communications manager 1105 may be an example of aspects of a communications manager 915, a communications manager 1015, or a communications manager 1210 described herein. The communications manager 1105 may include a BWP configuration manager 1110, a BFR manager 1115, and a BWP hopping manager 1120. Each of these modules may communicate, directly or indirectly, with one another (e.g., via one or more buses).

The BWP configuration manager 1110 may transmit, to a UE, a configuration identifying a set of BWPs for the UE to use to communicate with the base station by switching between the set of BWPs, the set of BWPs including at least a first BWP and a second BWP, and the configuration indicating that the UE is to transition to the second BWP to perform a BFR procedure. In some cases, the configuration includes an indicator of a first mode of a set of modes, where the first mode indicates that the UE is to transition to the second BWP to perform the BFR procedure, and where a second mode of the set of modes indicates that the UE is to perform the BFR procedure on the first BWP based on the first BWP being an active BWP for the UE when the beam failure was determined.

In some cases, the configuration includes a first configuration for the first BWP and a second configuration for the second BWP, the second configuration including an indication of one or more of a set of beams for beam recovery, a set of resources for a random access procedure, or a recovery search space of a CORESET. In some cases, the first configuration lacks the indication the set of beams for beam recovery, the set of resources for the random access procedure, and the recovery search space of the CORESET.

In some cases, the transmitted configuration indicates that the UE is to transition to the second BWP to perform the BFR procedure by indicating beam failure parameters for the second BWP in the transmitted configuration. In some cases, the transmitted configuration further indicates that the UE is to transition to the second BWP to perform the BFR procedure by failing to indicate beam failure parameters for the first BWP.

The BFR manager 1115 may receive, from the UE on an occasion associated with the second BWP, a preamble of the BFR procedure. In some examples, the BFR manager 1115 may determine, based on receiving the preamble on the occasion associated with the second BWP, that a beam failure has occurred at the UE.

The BWP hopping manager 1120 may transmit an indication of a hopping pattern for the set of BWPs, where the hopping pattern indicates a set of a time periods during which a different BWP of the set of BWPs is used by the UE to communicate with the base station, and where the switching between the set of BWPs is according to the identified hopping pattern.

Figure 12:
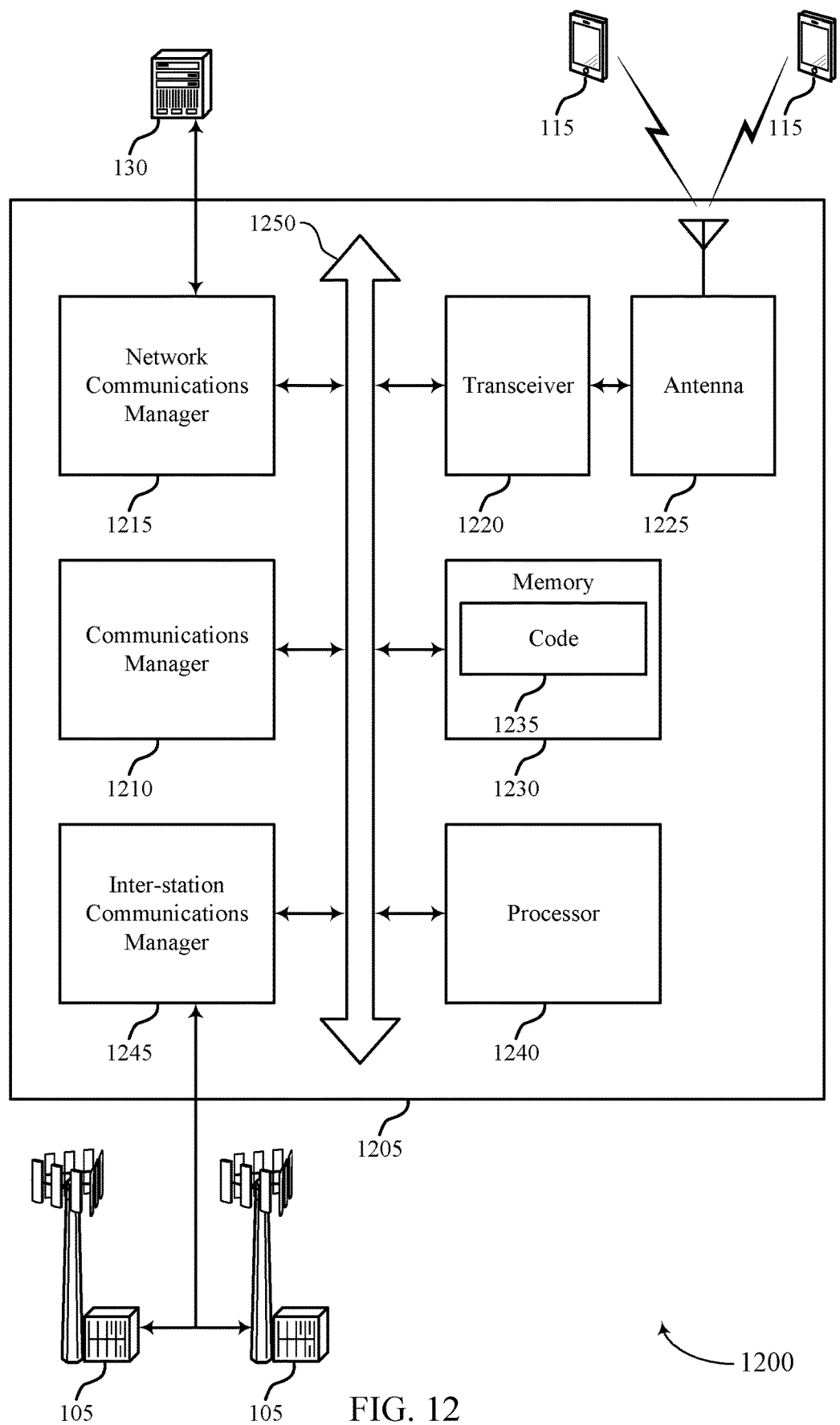
FIG. 12 shows a diagram of a system including a device that supports BFR procedure resource reduction with BWP hopping in accordance with aspects of the present disclosure.

FIG. 12 shows a diagram of a system 1200 including a device 1205 that supports BFR procedure resource reduction with BWP hopping in accordance with aspects of the present disclosure. The device 1205 may be an example of or include the components of device 905, device 1005, or a base station 105 as described herein. The device 1205 may include components for bi-directional voice and data communications including components for transmitting and receiving communications, including a communications manager 1210, a network communications manager 1215, a transceiver 1220, an antenna 1225, memory 1230, a processor 1240, and an inter-station communications manager 1245. These components may be in electronic communication via one or more buses (e.g., bus 1250).

The communications manager 1210 may transmit, to a UE, a configuration identifying a set of BWPs for the UE to use to communicate with the base station by switching between the set of BWPs, the set of BWPs including at least a first BWP and a second BWP, and the configuration indicating that the UE is to transition to the second BWP to perform a BFR procedure, receive, from the UE on an occasion associated with the second BWP, a preamble of the BFR procedure, and determine, based on receiving the preamble on the occasion associated with the second BWP, that a beam failure has occurred at the UE.

The network communications manager 1215 may manage communications with the core network (e.g., via one or more wired backhaul links). For example, the network communications manager 1215 may manage the transfer of data communications for client devices, such as one or more UEs 115.

The transceiver 1220 may communicate bi-directionally, via one or more antennas, wired, or wireless links as described herein. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include RAM, ROM, or a combination thereof. The memory 1230 may store computer-readable code 1235 including instructions that, when executed by a processor (e.g., the processor 1240) cause the device to perform various functions described herein. In some cases, the memory 1230 may contain, among other things, a BIOS which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some cases, a memory controller may be integrated into processor 1240. The processor 1240 may be configured to execute computer-readable instructions stored in a memory (e.g., the memory 1230) to cause the device 1205 to perform various functions (e.g., functions or tasks supporting BFR procedure resource reduction with BWP hopping).

The inter-station communications manager 1245 may manage communications with other base station 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communication network technology to provide communication between base stations 105.

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
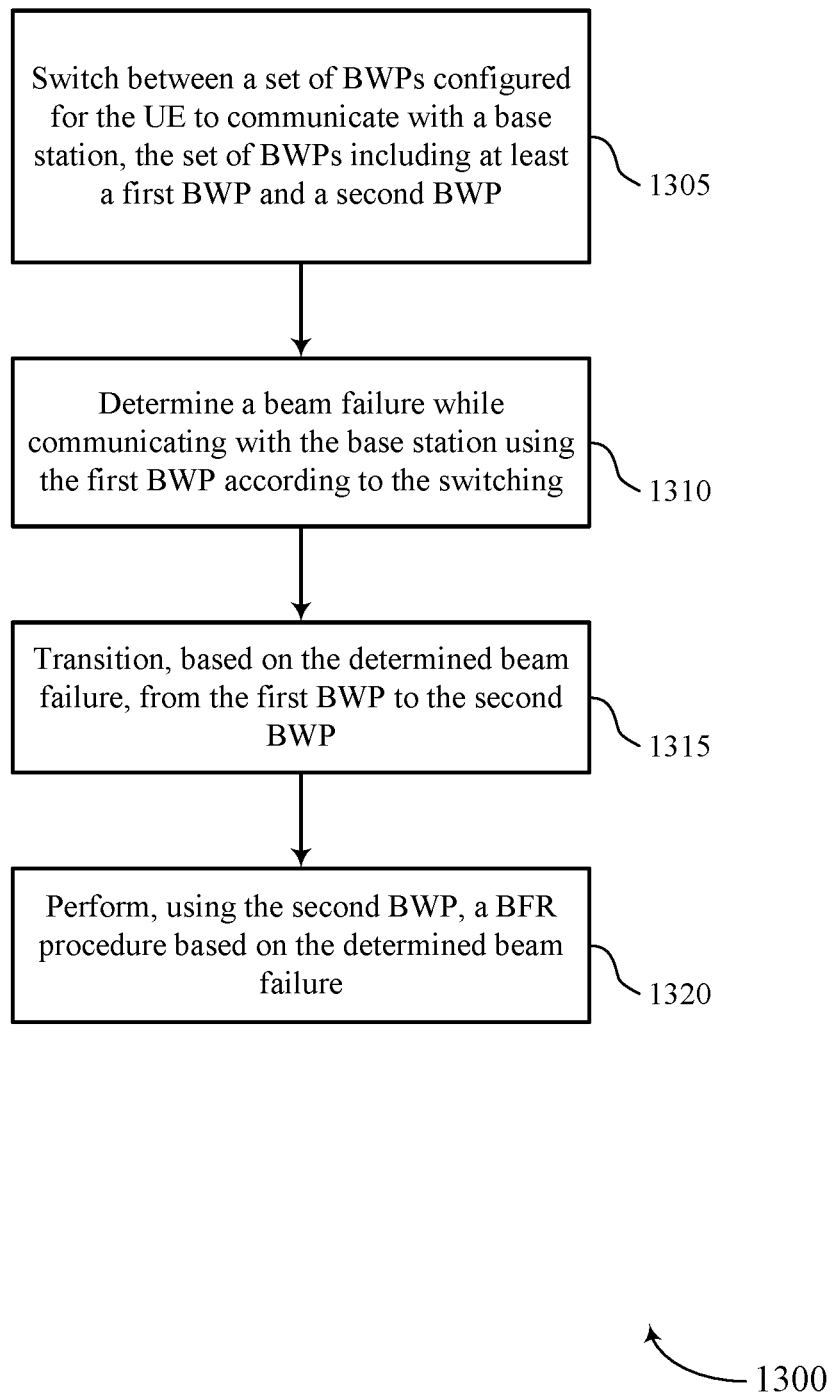
FIGS. 13 through 16 show flowcharts illustrating methods that support BFR procedure resource reduction with BWP hopping in accordance with aspects of the present disclosure.

FIG. 13 shows a flowchart illustrating a method 1300 that supports BFR procedure resource reduction with BWP hopping in accordance with aspects of the present disclosure. The operations of method 1300 may be implemented by a UE 115 or its components as described herein. For example, the operations of method 1300 may be performed by a communications manager as described with reference to FIGS. 5 through 8. In some examples, a UE may execute a set of instructions to control the functional elements of the UE to perform the functions described herein. Additionally or alternatively, a UE may perform aspects of the functions described herein using special-purpose hardware.

At 1305, the UE may switch between a set of BWPs configured for the UE to communicate with a base station, the set of BWPs including at least a first BWP and a second BWP. The operations of 1305 may be performed according to the methods described herein. In some examples, aspects of the operations of 1305 may be performed by a BWP hopping manager as described with reference to FIGS. 5 through 8.

At 1310, the UE may determine a beam failure while communicating with the base station using the first BWP according to the switching. The operations of 1310 may be performed according to the methods described herein. In some examples, aspects of the operations of 1310 may be performed by a BFD manager as described with reference to FIGS. 5 through 8.

At 1315, the UE may transition, based on the determined beam failure, from the first BWP to the second BWP. The operations of 1315 may be performed according to the methods described herein. In some examples, aspects of the operations of 1315 may be performed by a BWP switching manager as described with reference to FIGS. 5 through 8.

At 1320, the UE may perform, using the second BWP, a BFR procedure based on the determined beam failure. The operations of 1320 may be performed according to the methods described herein. In some examples, aspects of the operations of 1320 may be performed by a BFR manager as described with reference to FIGS. 5 through 8.

Figure 14:
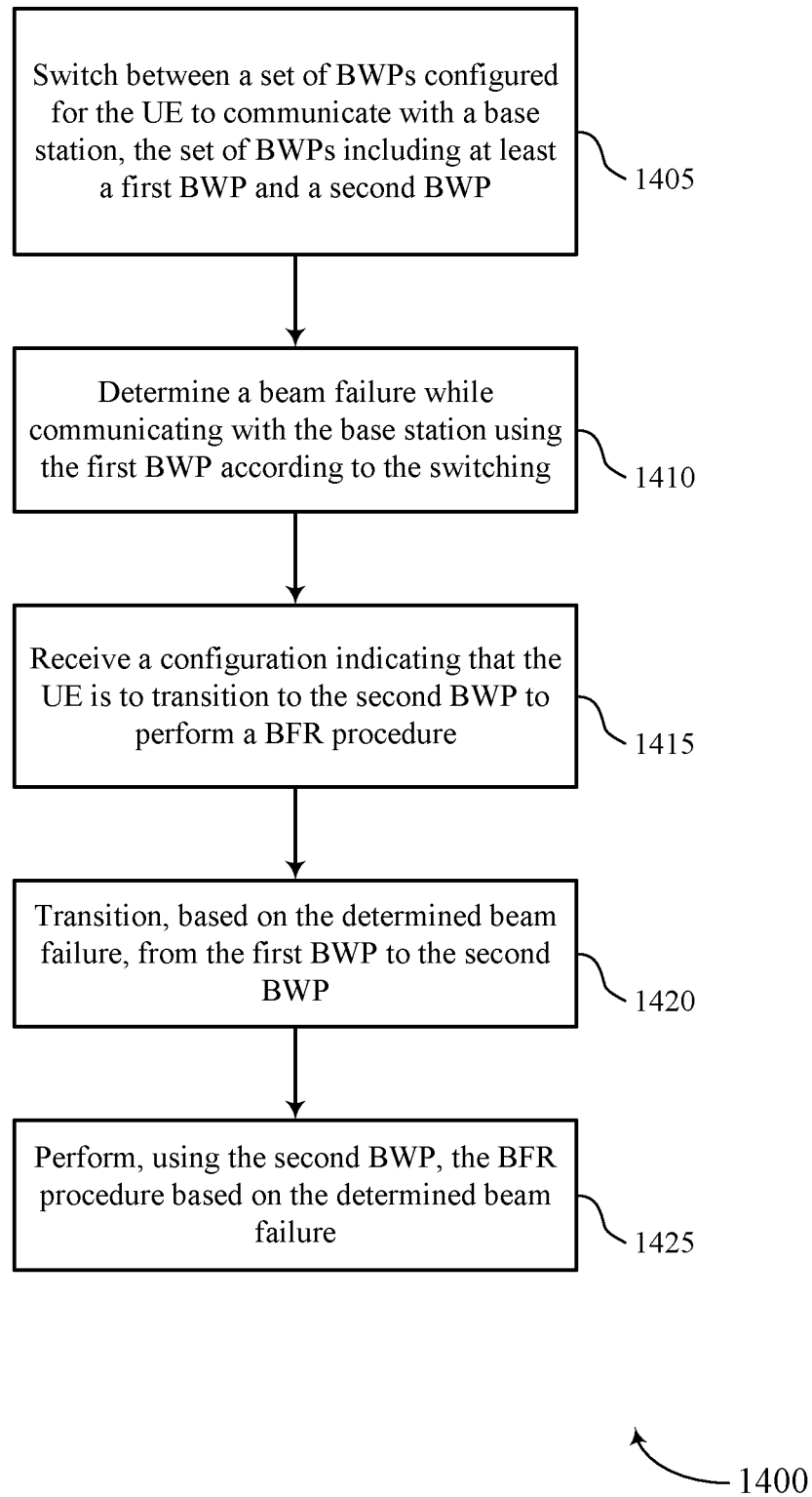

FIG. 14 shows a flowchart illustrating a method 1400 that supports BFR procedure resource reduction with BWP hopping in accordance with aspects of the present disclosure. The operations of method 1400 may be implemented by a UE 115 or its components as described herein. For example, the operations of method 1400 may be performed by a communications manager as described with reference to FIGS. 5 through 8. In some examples, a UE may execute a set of instructions to control the functional elements of the UE to perform the functions described herein. Additionally or alternatively, a UE may perform aspects of the functions described herein using special-purpose hardware.

At 1405, the UE may switch between a set of BWPs configured for the UE to communicate with a base station, the set of BWPs including at least a first BWP and a second BWP. The operations of 1405 may be performed according to the methods described herein. In some examples, aspects of the operations of 1405 may be performed by a BWP hopping manager as described with reference to FIGS. 5 through 8.

At 1410, the UE may determine a beam failure while communicating with the base station using the first BWP according to the switching. The operations of 1410 may be performed according to the methods described herein. In some examples, aspects of the operations of 1410 may be performed by a BFD manager as described with reference to FIGS. 5 through 8.

At 1415, the UE may receive a configuration indicating that the UE is to transition to the second BWP to perform the BFR procedure. The operations of 1415 may be performed according to the methods described herein. In some examples, aspects of the operations of 1415 may be performed by a BWP configuration manager as described with reference to FIGS. 5 through 8.

At 1420, the UE may transition, based on the determined beam failure, from the first BWP to the second BWP. The operations of 1420 may be performed according to the methods described herein. In some examples, aspects of the operations of 1420 may be performed by a BWP switching manager as described with reference to FIGS. 5 through 8.

At 1425, the UE may perform, using the second BWP, a BFR procedure based on the determined beam failure. The operations of 1425 may be performed according to the methods described herein. In some examples, aspects of the operations of 1425 may be performed by a BFR manager as described with reference to FIGS. 5 through 8.

Figure 15:
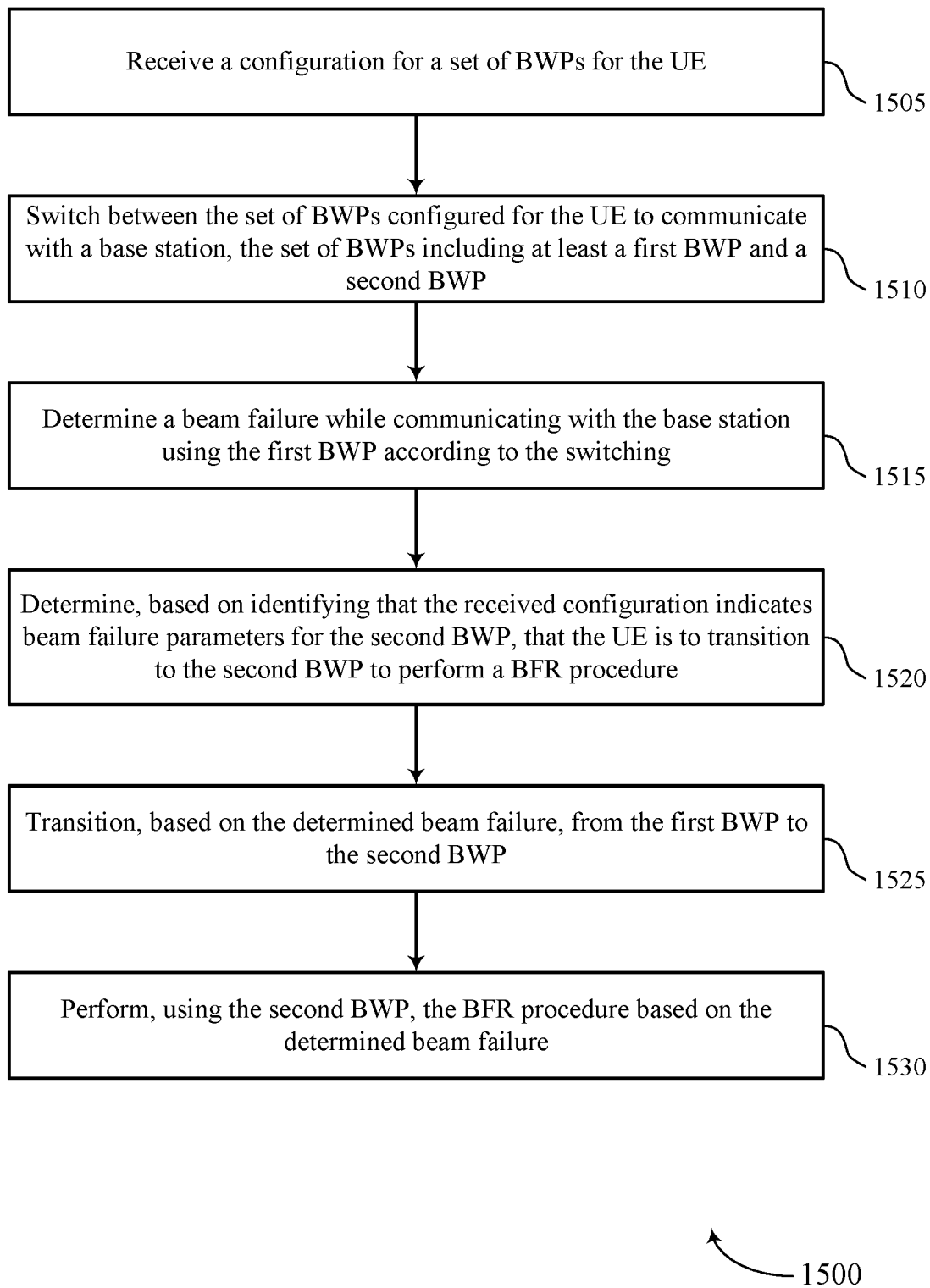

FIG. 15 shows a flowchart illustrating a method 1500 that supports BFR procedure resource reduction with BWP hopping in accordance with aspects of the present disclosure. The operations of method 1500 may be implemented by a UE 115 or its components as described herein. For example, the operations of method 1500 may be performed by a communications manager as described with reference to FIGS. 5 through 8. In some examples, a UE may execute a set of instructions to control the functional elements of the UE to perform the functions described herein. Additionally or alternatively, a UE may perform aspects of the functions described herein using special-purpose hardware.

At 1505, the UE may receive a configuration for the set of BWPs for the UE. The operations of 1505 may be performed according to the methods described herein. In some examples, aspects of the operations of 1505 may be performed by a BWP configuration manager as described with reference to FIGS. 5 through 8.

At 1510, the UE may switch between a set of BWPs configured for the UE to communicate with a base station, the set of BWPs including at least a first BWP and a second BWP. The operations of 1510 may be performed according to the methods described herein. In some examples, aspects of the operations of 1510 may be performed by a BWP hopping manager as described with reference to FIGS. 5 through 8.

At 1515, the UE may determine a beam failure while communicating with the base station using the first BWP according to the switching. The operations of 1515 may be performed according to the methods described herein. In some examples, aspects of the operations of 1515 may be performed by a BFD manager as described with reference to FIGS. 5 through 8.

At 1520, the UE may determine, based on identifying that the received configuration indicates beam failure parameters for the second BWP, that the UE is to transition to the second BWP to perform the BFR procedure. The operations of 1520 may be performed according to the methods described herein. In some examples, aspects of the operations of 1520 may be performed by a BWP switching manager as described with reference to FIGS. 5 through 8.

At 1525, the UE may transition, based on the determined beam failure, from the first BWP to the second BWP. The operations of 1525 may be performed according to the methods described herein. In some examples, aspects of the operations of 1525 may be performed by a BWP switching manager as described with reference to FIGS. 5 through 8.

At 1530, the UE may perform, using the second BWP, a BFR procedure based on the determined beam failure. The operations of 1530 may be performed according to the methods described herein. In some examples, aspects of the operations of 1530 may be performed by a BFR manager as described with reference to FIGS. 5 through 8.

Figure 16:
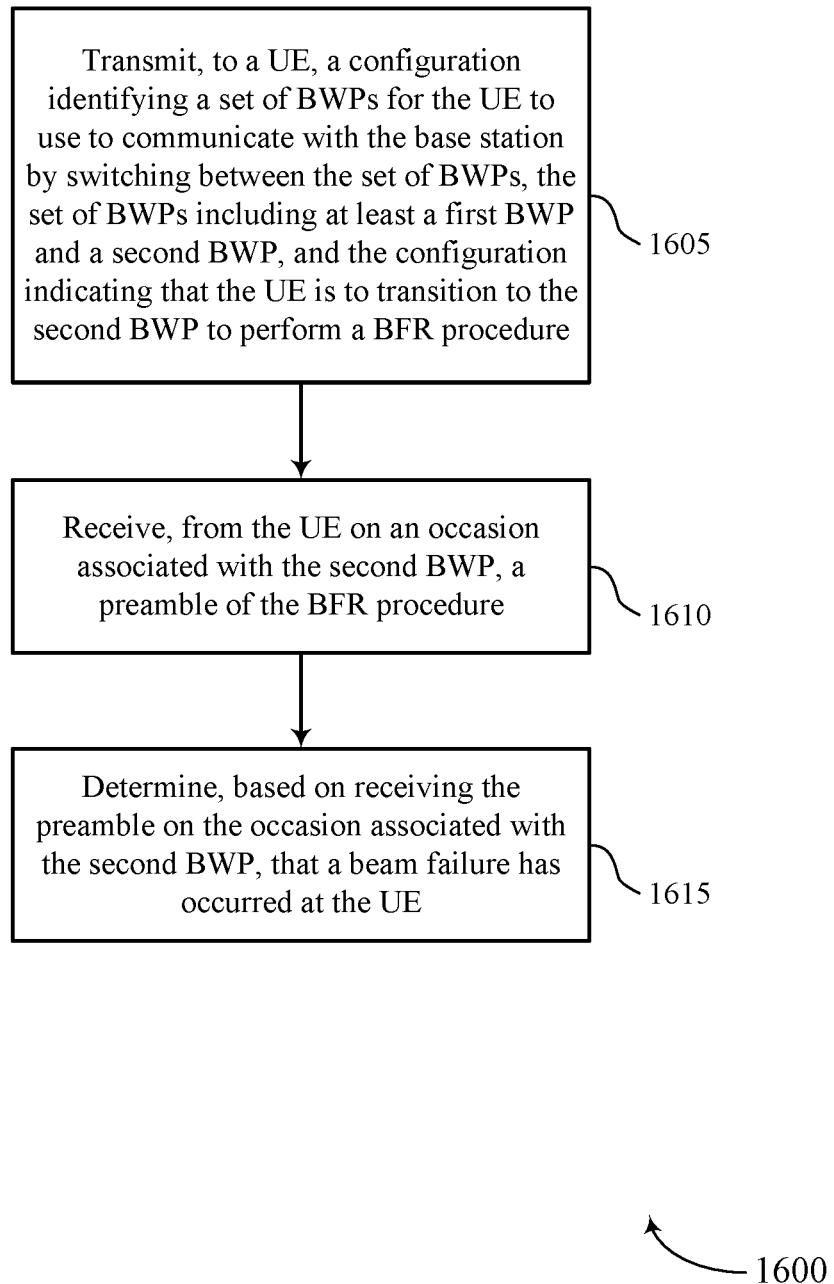

FIG. 16 shows a flowchart illustrating a method 1600 that supports BFR procedure resource reduction with BWP hopping in accordance with aspects of the present disclosure. The operations of method 1600 may be implemented by a base station 105 or its components as described herein. For example, the operations of method 1600 may be performed by a communications manager as described with reference to FIGS. 9 through 12. In some examples, a base station may execute a set of instructions to control the functional elements of the base station to perform the functions described herein. Additionally or alternatively, a base station may perform aspects of the functions described herein using special-purpose hardware.

At 1605, the base station may transmit, to a UE, a configuration identifying a set of BWPs for the UE to use to communicate with the base station by switching between the set of BWPs, the set of BWPs including at least a first BWP and a second BWP, and the configuration indicating that the UE is to transition to the second BWP to perform a BFR procedure. The operations of 1605 may be performed according to the methods described herein. In some examples, aspects of the operations of 1605 may be performed by a BWP configuration manager as described with reference to FIGS. 9 through 12.

At 1610, the base station may receive, from the UE on an occasion associated with the second BWP, a preamble of the BFR procedure. The operations of 1610 may be performed according to the methods described herein. In some examples, aspects of the operations of 1610 may be performed by a BFR manager as described with reference to FIGS. 9 through 12.

At 1615, the base station may determine, based on receiving the preamble on the occasion associated with the second BWP, that a beam failure has occurred at the UE. The operations of 1615 may be performed according to the methods described herein. In some examples, aspects of the operations of 1615 may be performed by a BFR manager as described with reference to FIGS. 9 through 12.

The following provides an overview of aspects of the present disclosure:

Aspect 1: A method for wireless communication at a UE, comprising: switching between a plurality of BWPs configured for the UE to communicate with a base station, the plurality of BWPs including at least a first BWP and a second BWP; determining a beam failure while communicating with the base station using the first BWP according to the switching; transitioning, based at least in part on the determined beam failure, from the first BWP to the second BWP; and performing, using the second BWP, a BFR procedure based at least in part on the determined beam failure.

Aspect 2: The method of aspect 1, further comprising: receiving a configuration indicating that the UE is to transition to the second BWP to perform the BFR procedure.

Aspect 3: The method of aspect 2, wherein the configuration comprises an indicator of a first mode of a set of modes, the first mode indicates that the UE is to transition to the second BWP to perform the BFR procedure, and a second mode of the set of modes indicates that the UE is to perform the BFR procedure on the first BWP based at least in part on the first BWP being an active BWP for the UE when the beam failure was determined.

Aspect 4: The method of any of aspects 2 or 3, wherein the configuration comprises a first configuration for the first BWP and a second configuration for the second BWP, the second configuration comprising an indication of one or more of a set of beams for beam recovery, a set of resources for a random access procedure, or a recovery search space of a CORESET.

Aspect 5: The method of aspect 4, wherein the first configuration lacks the indication the set of beams for beam recovery, the set of resources for the random access procedure, and the recovery search space of the CORESET.

Aspect 6: The method of any of aspects 1 through 5, further comprising: receiving a configuration for the plurality of BWPs for the UE; and determining, based at least in part on identifying that the received configuration indicates beam failure parameters for the second BWP, that the UE is to transition to the second BWP to perform the BFR procedure.

Aspect 7: The method of aspect 6, further comprising: identifying that the received configuration fails to indicate beam failure parameters for the first BWP, wherein determining that the UE is to transition to the second BWP to perform the BFR procedure is further based at least in part on identifying that the received configuration fails to indicate the beam failure parameters for the first BWP.

Aspect 8: The method of any of aspects 1 through 7, further comprising: starting a timer associated with the BFR procedure based at least in part on the transitioning from the first BWP to the second BWP.

Aspect 9: The method of aspect 8, wherein the transitioning from the first BWP to the second BWP is performed after expiry of a timer associated with BFD, the timer associated with the BFR procedure started after the expiry of the timer associated with the BFD and a beam switching gap duration.

Aspect 10: The method of any of aspects 1 through 9, further comprising: identifying a hopping pattern for the plurality of BWPs configured for the UE, wherein the hopping pattern indicates a plurality of a time periods during which a different BWP of the plurality of BWPs is used by the UE to communicate with the base station, and wherein the switching between the plurality of BWPs is according to the identified hopping pattern.

Aspect 11: The method of any of aspects 1 through 10, wherein determining the beam failure comprises: counting, while communicating the base station using the plurality of BWPs according to the switching, a number of instances of beam failure for beams associated with the plurality of BWPs; identifying that the counted number of instances of the beam failure satisfies a threshold value; and determining the beam failure associated with the plurality of BWPs based at least in part on the counted number of instances of the beam failure satisfying the threshold value.

Aspect 12: The method of any of aspects 1 through 11, wherein performing the BFR procedure using the second BWP comprises: measuring a signal quality of one or more reference signals of a set of one or more beams for beam recovery; selecting, based at least in part on the measured signal quality of the one or more reference signals, a beam of the set of one or more beams for beam recovery; transmitting, on the selected beam, a preamble the BFR procedure; and receiving, in response to the transmitted signal, a response of the BFR procedure.

Aspect 13: A method for wireless communication at a base station, comprising: transmitting, to a UE, a configuration identifying a plurality of BWPs for the UE to use to communicate with the base station by switching between the plurality of BWPs, the plurality of BWPs including at least a first BWP and a second BWP, and the configuration indicating that the UE is to transition to the second BWP to perform a BFR procedure; receiving, from the UE on an occasion associated with the second BWP, a preamble of the BFR procedure; and determining, based at least in part on receiving the preamble on the occasion associated with the second BWP, that a beam failure has occurred at the UE.

Aspect 14: The method of aspect 13, wherein the configuration comprises an indicator of a first mode of a set of modes, the first mode indicates that the UE is to transition to the second BWP to perform the BFR procedure, and a second mode of the set of modes indicates that the UE is to perform the BFR procedure on the first BWP based at least in part on the first BWP being an active BWP for the UE when the beam failure was determined.

Aspect 15: The method of any of aspects 13 or 14, wherein the configuration comprises a first configuration for the first BWP and a second configuration for the second BWP, the second configuration comprising an indication of one or more of a set of beams for beam recovery, a set of resources for a random access procedure, or a recovery search space of a CORESET.

Aspect 16: The method of aspect 15, wherein the first configuration lacks the indication the set of beams for beam recovery, the set of resources for the random access procedure, and the recovery search space of the CORESET.

Aspect 17: The method of any of aspects 13 through 16, wherein the transmitted configuration indicates that the UE is to transition to the second BWP to perform the BFR procedure by indicating beam failure parameters for the second BWP in the transmitted configuration.

Aspect 18: The method of aspect 17, wherein the transmitted configuration further indicates that the UE is to transition to the second BWP to perform the BFR procedure by failing to indicate beam failure parameters for the first BWP.

Aspect 19: The method of any of aspects 13 through 18, further comprising: transmitting an indication of a hopping pattern for the plurality of BWPs, wherein the hopping pattern indicates a plurality of a time periods during which a different BWP of the plurality of BWPs is used by the UE to communicate with the base station, and wherein the switching between the plurality of BWPs is according to the identified hopping pattern.

Aspect 20: An apparatus for wireless communication at a UE, comprising a processor; memory coupled with the processor; and instructions stored in the memory and executable by the processor to cause the apparatus to perform a method of any of aspects 1 through 12.

Aspect 21: An apparatus for wireless communication at a UE, comprising at least one means for performing a method of any of aspects 1 through 12.

Aspect 22: A non-transitory computer-readable medium storing code for wireless communication at a UE, the code comprising instructions executable by a processor to perform a method of any of aspects 1 through 12.

Aspect 23: An apparatus for wireless communication at a base station, comprising a processor; memory coupled with the processor; and instructions stored in the memory and executable by the processor to cause the apparatus to perform a method of any of aspects 13 through 19.

Aspect 24: An apparatus for wireless communication at a base station, comprising at least one means for performing a method of any of aspects 13 through 19.

Aspect 25: A non-transitory computer-readable medium storing code for wireless communication at a base station, the code comprising instructions executable by a processor to perform a method of any of aspects 13 through 19.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
    receiving a message indicating a configuration that includes an indication that the UE is to switch to a first bandwidth part to perform a beam failure recovery procedure based at least in part on a beam failure while the UE is communicating using any other of plurality of bandwidth parts, wherein the configuration indicates beam failure parameters associated with the first bandwidth part;
    switching, after an occurrence of the beam failure while communicating using a second bandwidth part of the plurality of bandwidth parts, from the second bandwidth part to the first bandwidth part, wherein the switching is in accordance with the configuration indicating the beam failure parameters associated with the first bandwidth part and the configuration being absent of beam failure parameters associated with the second bandwidth part; and
    performing, using the first bandwidth part, the beam failure recovery procedure based at least in part on the configuration.

2. The method of claim 1, wherein the indication comprises an indicator of a first mode of a set of modes, wherein the first mode indicates that the UE is to switch to the first bandwidth part to perform the beam failure recovery procedure, and wherein a second mode of the set of modes indicates that the UE is to perform the beam failure recovery procedure on the second-bandwidth part based at least in part on the second bandwidth part being an active bandwidth part if the beam failure occurs.

3. The method of claim 1, wherein the configuration comprises a first configuration associated with the second bandwidth part and a second configuration associated with the first bandwidth part, the second configuration comprising an indication of one or more of a set of beams for beam recovery, a set of resources for a random access procedure, and a recovery search space of a control resource set.

4. The method of claim 3, wherein the first configuration is independent of an indication of one or more of the set of beams for beam recovery, the set of resources for the random access procedure, and the recovery search space of the control resource set.

5. The method of claim 1, further comprising:
    starting a timer associated with the beam failure recovery procedure based at least in part on the switch from the second bandwidth part to the first bandwidth part.

6. The method of claim 1, wherein a hopping pattern indicates a plurality of time periods during which a different bandwidth part of the plurality of bandwidth parts is used by the UE to communicate with a network device, and wherein the switch is further based on the hopping pattern.

7. The method of claim 1, further comprising:
    counting, while communicating using the plurality of bandwidth parts according to the configuration, a quantity of instances of beam failure for beams associated with the plurality of bandwidth parts, wherein a declaration of the beam failure is based at least in part on the counted quantity of instances of the beam failure satisfying a threshold value.

8. The method of claim 1, wherein performing the beam failure recovery procedure using the first bandwidth part comprises:
    measuring a signal quality of one or more reference signals of a set of one or more beams for beam recovery;
    selecting, based at least in part on the measured signal quality of the one or more reference signals, a beam of the set of one or more beams;
    transmitting, via the selected beam, a preamble; and
    receiving, after transmitting the preamble, a response.

9. A method for wireless communication at a network device, comprising:
    transmitting a message comprising a configuration that includes an indication that a user equipment (UE) is to switch to a first bandwidth part to perform a beam failure recovery procedure based at least in part on a beam failure while the UE is communicating using any other of a plurality of bandwidth parts, wherein the configuration indicates beam failure parameters associated with the first bandwidth part; and
    receiving, via an occasion associated with the first bandwidth part, a preamble of the beam failure recovery procedure, wherein the preamble is configured to indicate that the beam failure has occurred while the UE was communicating using a second bandwidth part of the plurality of bandwidth parts, and wherein the receiving is in accordance with the configuration indicating the beam failure parameters associated with the first bandwidth part and the configuration being absent of beam failure parameters associated with the second bandwidth part.

10. An apparatus for wireless communication, comprising:
at least one processor; and
memory comprising instructions executable by the at least one processor to cause the apparatus to:
receive a message indicating a configuration that includes an indication that the apparatus is to switch to a first bandwidth part to perform a beam failure recovery procedure based at least in part on a beam failure while the apparatus is communicating using any other of a plurality of bandwidth parts, wherein the configuration indicates beam failure parameters associated with the first bandwidth part;
switch, after an occurrence of the beam failure while communicating using a second bandwidth part of the plurality of bandwidth parts, from the second bandwidth part to the first bandwidth part, wherein the switching is in accordance with the configuration indicating the beam failure parameters associated with the first bandwidth part and the configuration being absent of beam failure parameters associated with the second bandwidth part; and
perform, using the first bandwidth part, the beam failure recovery procedure based at least in part on the configuration.

11. The apparatus of claim 10, wherein the indication comprises an indicator of a first mode of a set of modes, wherein the first mode indicates that the apparatus is to switch to the first bandwidth part to perform the beam failure recovery procedure, and wherein a second mode of the set of modes indicates that the apparatus is to perform the beam failure recovery procedure on the second-bandwidth part based at least in part on the second-bandwidth part being an active bandwidth part if the beam failure occurs.

12. The apparatus of claim 10, wherein the configuration comprises a first configuration associated with the second bandwidth part and a second configuration associated with the first bandwidth part, the second configuration comprising an indication of one or more of a set of beams for beam recovery, a set of resources for a random access procedure, and a recovery search space of a control resource set.

13. The apparatus of claim 12, wherein the first configuration is independent of an indication of one or more of the set of beams for beam recovery, the set of resources for the random access procedure, and the recovery search space of the control resource set.

14. The apparatus of claim 10, wherein the configuration indicates the beam failure parameters associated with only the first bandwidth part therein, and wherein the apparatus is to switch to the first bandwidth part to perform the beam failure recovery procedure based at least in part on the configuration indicating the beam failure parameters associated with only the first bandwidth part therein.

15. The apparatus of claim 10, wherein the instructions are further executable by the at least one processor to cause the apparatus to:

start a timer associated with the beam failure recovery procedure based at least in part on the switch from the second-bandwidth part to the first bandwidth part.

16. The apparatus of claim 15, wherein the switch from the second-bandwidth part to the first bandwidth part is performed after expiry of a timer associated with beam failure detection, the timer associated with the beam failure recovery procedure started after the expiry of the timer associated with the beam failure detection and a beam switching gap duration.

17. The apparatus of claim 10, wherein a hopping pattern indicates a plurality of time periods during which a different bandwidth part of the plurality of bandwidth parts is used by the apparatus to communicate with a network device, and wherein the switch is further based on the hopping pattern.

18. The apparatus of claim 10, wherein the instructions are further executable by the at least one processor to cause the apparatus to:
count, while communicating using the plurality of bandwidth parts according to the configuration, a quantity of instances of beam failure for beams associated with the plurality of bandwidth parts, wherein a declaration of the beam failure is based at least in part on the quantity of instances of the beam failure satisfying a threshold value.

19. The apparatus of claim 10, further comprising a transceiver, wherein:
the instructions to perform the beam failure recovery procedure using the first bandwidth part are executable by the at least one processor to cause the apparatus to:
measure a signal quality of one or more reference signals of a set of one or more beams for beam recovery; and
select, based at least in part on the measured signal quality of the one or more reference signals, a beam of the set of one or more beams;
the transceiver is configured to:
transmit, via the transceiver and via the selected beam, a preamble; and
receive, in response to the transmitted preamble, a response, wherein:
the apparatus is configured as a user equipment (UE).

20. A network device, comprising:
a transceiver;
at least one processor; and
memory comprising instructions executable by the at least one processor to cause the network device to:
transmit, via the transceiver, a message comprising a configuration that includes an indication that a user equipment (UE) is to switch to a first bandwidth part to perform a beam failure recovery procedure based at least in part on a beam failure while the UE is communicating using any other of a plurality of bandwidth parts, wherein the configuration indicates beam failure parameters associated with the first bandwidth part; and
receive, via an occasion associated with the first bandwidth part, a preamble of the beam failure recovery procedure, wherein the preamble is configured to indicate that the beam failure has occurred while the UE was communicating using a second bandwidth part of the plurality of bandwidth parts, and wherein the receiving is in accordance with the configuration indicating the beam failure parameters associated with the first bandwidth part and the configuration being absent of beam failure parameters associated with the second bandwidth part.

21. The network device of claim 20, wherein the indication comprises an indicator of a first mode of a set of modes, wherein the first mode indicates that the UE is to switch to the first bandwidth part to perform the beam failure recovery procedure, and wherein a second mode of the set of modes indicates that the UE is to perform the beam failure recovery procedure on the second-bandwidth part based at least in part on the second-bandwidth part being an active bandwidth part if the beam failure occurred.

22. The network device of claim 20, wherein the configuration comprises a first configuration associated with the second bandwidth part and a second configuration associated with the first bandwidth part, the second configuration comprising an indication of one or more of a set of beams for beam recovery, a set of resources for a random access procedure, and a recovery search space of a control resource set.

23. The network device of claim 22, wherein the first configuration is independent of an indication of one or more of the set of beams for beam recovery, the set of resources for the random access procedure, and the recovery search space of the control resource set.

24. The network device of claim 20, wherein the configuration indicates that the UE is to switch to the first bandwidth part to perform the beam failure recovery procedure by including the beam failure parameters associated with only the first bandwidth part therein.

25. The network device of claim 20, wherein the transceiver is further configured to:
    transmit, via the transceiver, an indication of a hopping pattern associated with the plurality of bandwidth parts, wherein the hopping pattern indicates a plurality of time periods during which a different bandwidth part of the plurality of bandwidth parts is used by the UE to communicate with the network device, and wherein the switch is further based on the hopping pattern.

* * * * *